US012668716B2

(12) United States Patent
Kriley et al.

(10) Patent No.: US 12,668,716 B2
(45) Date of Patent: Jun. 30, 2026

(54) SYSTEMS AND METHODS FOR IMPROVED LAP SHEAR STRENGTH AND DISPLACEMENT OF TWO-COMPONENT STRUCTURAL ADHESIVES

(71) Applicant: PPG Industries Ohio, Inc., Cleveland, OH (US)

(72) Inventors: Joseph P. Kriley, Valencia, PA (US); Marvin M. Pollum, Jr., Pittsburgh, PA (US); David J. Fortman, Pittsburgh, PA (US); Brian K. Rearick, Allison Park, PA (US); Masayuki Nakajima, Wexford, PA (US); Elizabeh S. Brown-Tseng, Gibsonia, PA (US); Steven E. Bowles, Pittsburgh, PA (US); Maria S. French, Canfield, OH (US)

(73) Assignee: PPG Industries Ohio, Inc., Cleveland, OH (US)

( * ) Notice: Subject to any disclaimer, the term of this patent is extended or adjusted under 35 U.S.C. 154(b) by 866 days.

(21) Appl. No.: 17/753,183

(22) PCT Filed: Jun. 23, 2020

(86) PCT No.: PCT/US2020/039142
§ 371 (c)(1),
(2) Date: Feb. 23, 2022

(87) PCT Pub. No.: WO2021/040868
PCT Pub. Date: Mar. 4, 2021

(65) Prior Publication Data

US 2022/0282115 A1 Sep. 8, 2022

Related U.S. Application Data

(60) Provisional application No. 62/890,911, filed on Aug. 23, 2019.

(51) Int. Cl.
*C09D 163/00* (2006.01)
*C09D 5/08* (2006.01)
*C09D 7/61* (2018.01)

(52) U.S. Cl.
CPC .......... *C09D 163/00* (2013.01); *C09D 5/084* (2013.01); *C09D 7/61* (2018.01)

(58) Field of Classification Search
CPC ........ C09D 163/00; C09D 5/084; C09D 7/61; C08K 3/11; C23G 1/125; C23G 1/02; C09J 5/02; C09J 163/00; C09J 2463/00; C08G 59/184; C23C 22/34; C23C 22/83; B33Y 70/00
See application file for complete search history.

(56) References Cited

U.S. PATENT DOCUMENTS

| | | | | |
|---|---|---|---|---|
| 4,122,069 | A | 10/1978 | Meyer | |
| 4,476,285 | A | 10/1984 | Crabtree et al. | |
| 4,540,750 | A * | 9/1985 | Ham | C08G 59/184 528/111 |
| 4,793,867 | A | 12/1988 | Charles et al. | |
| 5,489,630 | A | 2/1996 | Walker | |
| 5,588,989 | A | 12/1996 | Vonk et al. | |
| 5,597,876 | A | 1/1997 | Murata et al. | |
| 5,677,006 | A | 10/1997 | Hoenel et al. | |
| 5,874,624 | A | 2/1999 | Horiguchi et al. | |
| 6,288,208 | B1 | 9/2001 | Moshinsky | |
| 6,312,812 | B1 * | 11/2001 | Hauser | B23K 35/226 428/412 |
| 6,432,485 | B1 | 8/2002 | Beyers et al. | |
| 7,737,199 | B2 | 6/2010 | Barker | |
| 7,749,368 | B2 | 7/2010 | McMurdie et al. | |
| 8,263,687 | B2 | 9/2012 | Muller-Frischinger et al. | |
| 8,673,091 | B2 | 3/2014 | McMillen et al. | |
| 8,759,464 | B2 | 6/2014 | Horgan et al. | |
| 8,796,361 | B2 | 8/2014 | Asay et al. | |
| 9,562,175 | B2 | 2/2017 | Asay et al. | |
| 9,567,480 | B2 | 2/2017 | Vogel et al. | |

(Continued)

FOREIGN PATENT DOCUMENTS

| | | |
|---|---|---|
| CA | 2191419 A1 | 5/1997 |
| CA | 2100016 C | 6/1997 |

(Continued)

OTHER PUBLICATIONS

International Search Report and Written Opinion received for PCT Application Serial No. PCT/US2020/039142 dated Nov. 9, 2020, 11 pages.
International Search Report and Written Opinion received for PCT Application Serial No. PCT/US2020/039130 dated Feb. 5, 2021, 8 pages.
"Adhesive and mechanical properties of hybrid polyhydroxyurethane-epoxy network polymers", Lambeth, Robert H., Abstracts of Papers, 256th ACS National Meeting & Exposition, Boston, MA, United States, Aug. 19-23, 2018.
"CO2 derived hydrogen bonding spacer: enhanced toughness, transparency, elongation and non-covalent interactions in epoxy-hydroxyurethane networks", Anitha, S. et al., Journal of Materials Chemistry A: Materials for Energy and Sustainability 2017.

(Continued)

*Primary Examiner* — Doris L Lee

(57) ABSTRACT

Disclosed are systems for treating a substrate comprising a deoxidizing composition and a coating composition. The deoxidizing composition comprises a Group IVA metal and/or a Group IVB metal and free fluoride, optionally may comprise a homopolymer or copolymer comprising a phosphorous-containing monomeric subunit, and has a pH of 1.0 to 3.0. The coating composition comprises first and second components and elastomeric particles. The first component comprises an epoxy-containing compound (E1) and/or an epoxide-functional adduct (E2). The second component comprises a diamine and/or a polyamine comprising a cyclic ring (A2) and/or an amine-functional adduct (A3). The present invention is also directed to methods of making the compositions, methods of coating a substrate, and coated substrates.

7 Claims, No Drawings

(56) References Cited

U.S. PATENT DOCUMENTS

| | | | | |
|---|---|---|---|---|
| 2002/0183450 | A1 | 12/2002 | Smith | |
| 2003/0205299 | A1 | 11/2003 | Greene et al. | |
| 2003/0230364 | A1 * | 12/2003 | Greene | C23C 22/73 148/256 |
| 2004/0079647 | A1 | 4/2004 | Warburton et al. | |
| 2007/0207284 | A1 | 9/2007 | McClintic | |
| 2009/0226729 | A1 | 9/2009 | Niimoto et al. | |
| 2009/0239093 | A1 | 9/2009 | Inbe et al. | |
| 2012/0129980 | A1 | 5/2012 | Desai et al. | |
| 2012/0210758 | A1 | 8/2012 | Dolev et al. | |
| 2013/0217806 | A1 | 8/2013 | Gehringer et al. | |
| 2013/0244026 | A1 | 9/2013 | Inbe et al. | |
| 2015/0082747 | A1 | 3/2015 | Honda et al. | |
| 2015/0240111 | A1 | 8/2015 | Vogel et al. | |
| 2016/0083501 | A1 | 3/2016 | Grun et al. | |
| 2016/0159833 | A1 | 6/2016 | Kramer et al. | |
| 2017/0015883 | A1 | 1/2017 | Lammerschop et al. | |
| 2017/0107318 | A1 | 4/2017 | Nakajima et al. | |
| 2017/0158806 | A1 | 6/2017 | Peters et al. | |

FOREIGN PATENT DOCUMENTS

| | | | |
|---|---|---|---|
| CN | 101014639 | B | 5/2010 |
| CN | 101880376 | A | 11/2010 |
| CN | 102453458 | B | 6/2013 |
| CN | 102838960 | B | 11/2013 |
| CN | 102875057 | B | 12/2013 |
| CN | 104559064 | A | 4/2015 |
| CN | 104817992 | A | 8/2015 |
| CN | 103270128 | B | 9/2015 |
| CN | 104903382 | A | 9/2015 |
| CN | 103408726 | B | 12/2015 |
| EP | 0253339 | B1 | 12/1993 |
| EP | 1070733 | A1 | 1/2001 |
| EP | 1070748 | A1 | 1/2001 |
| EP | 1788048 | A1 | 5/2007 |
| EP | 1997934 | A1 | 3/2008 |
| EP | 3118240 | B1 | 5/2018 |
| GB | 1061699 | A | 3/1967 |
| JP | 57202318 | A | 12/1982 |
| JP | H06299133 | A | 10/1994 |
| JP | 2003020379 | A | 1/2003 |
| JP | 2004269680 | A | 9/2004 |
| JP | 2008001789 | A | 1/2008 |
| JP | 2011012144 | A | 1/2011 |
| JP | 2015093941 | A | 5/2015 |
| JP | 2017124629 | A | 7/2017 |
| JP | 2017222760 | A | 12/2017 |
| KR | 10-0193921 | B1 | 6/1999 |
| KR | 10-2001-0086434 | A | 9/2001 |
| KR | 10-2005-0006211 | A | 1/2005 |
| KR | 10-2014-0101838 | A | 8/2014 |
| KR | 10-2015-0079622 | A | 7/2015 |
| KR | 20170033942 | A | 3/2017 |
| WO | 00/22030 | A1 | 4/2000 |
| WO | 2003093532 | A3 | 6/2004 |
| WO | 2008016889 | A1 | 2/2008 |
| WO | 2011157671 | A1 | 12/2011 |
| WO | 2013060950 | A1 | 5/2013 |
| WO | 2014150020 | A1 | 9/2014 |
| WO | 2014158705 | A1 | 10/2014 |
| WO | 2015102911 | A1 | 7/2015 |
| WO | 2015150543 | A1 | 10/2015 |
| WO | 2015175583 | A1 | 11/2015 |
| WO | 2015191326 | A1 | 12/2015 |
| WO | 2016084960 | A1 | 6/2016 |
| WO | 2016176568 | A1 | 11/2016 |
| WO | 2016208618 | A1 | 12/2016 |
| WO | 2019004459 | A1 | 1/2019 |
| WO | 2020167758 | A1 | 8/2020 |

OTHER PUBLICATIONS

"Development of epoxy-urethane hybrid coatings via non-isocyanate route", Wazarkar, Kunal et al., European Polymer Journal 2016.

"Hybrid non-isocyanate polyurethane adhesives and sealing agents", Biryukova, O. V. et al., Klei, Germetiki, Tekhnologii 2005. (English language Abstract).

"Polyamines containing β-hydroxyurethane linkages as curing agents for epoxy resin", Rokicki, Gabriel et al., Angewandte Makromolekulare Chemie 1989.

"Epoxy coatings plasticized by cyclic carbonates", Kutsenok, B. I. et al., Lakokrasochnye Materialy i lkh Primenenie 1983. (English language Abstract).

Jensen, Robert E., et al., "Single-Lap-Joint Screening of Hysol EA 9309NA Epoxy Adhesive", ARL-TR-8011, ARL, US Army Research Laboratory, May 2017, 32 pages.

* cited by examiner

SYSTEMS AND METHODS FOR IMPROVED LAP SHEAR STRENGTH AND DISPLACEMENT OF TWO-COMPONENT STRUCTURAL ADHESIVES

CROSS-REFERENCE

This application claims the benefit of U.S. Provisional Patent Application Ser. No. 62/890,911, filed Aug. 23, 2019, the entire contents of which is incorporated herein by reference

GOVERNMENT CONTRACT

This disclosure was made with Government support under Government Contract No. 201867-140932 entitled Consolidation of Adhesives and Sealants Phase II FY17 awarded by the CCDC Ground Vehicle Systems Center. The United States Government may have certain rights in the subject matter disclosed herein.

FIELD OF THE INVENTION

The present invention relates to compositions, systems and methods for treating a metal substrate.

BACKGROUND OF THE INVENTION

The use of protective coatings on metal substrates for improved corrosion resistance and paint adhesion is common. Coating compositions, including sealants and adhesives, are utilized in a wide variety of applications to treat a variety of substrates or to bond together two or more substrate materials.

SUMMARY OF THE INVENTION

Disclosed herein is a system for treating a substrate, comprising: a deoxidizing composition comprising a Group IVA metal and/or a Group IVB metal and free fluoride, wherein the deoxidizing composition has a pH of 1.0 to 3.0; and a coating composition comprising: a first component comprising an epoxy-containing compound (E1); and a second component that chemically reacts with the epoxy-containing compound (E1), the second component comprising an amine-functional adduct (A3) comprising a second reaction product of a reaction mixture comprising an epoxide-functional adduct (E2) comprising a first reaction product of a reaction mixture comprising an epoxy-containing compound (E1) and a diamine comprising a cyclic ring and/or a polyamine comprising a cyclic ring (A1).

Also disclosed herein is a system for treating a substrate, comprising: a deoxidizing composition comprising a Group IVA metal and/or a Group IVB metal and free fluoride, wherein the deoxidizing composition has a pH of 1.0 to 3.0; and a coating composition comprising: a first component comprising the epoxide-functional adduct (E2) comprising a first reaction product of a reaction mixture comprising an epoxy-containing compound (E1) and a diamine comprising a cyclic ring and/or a polyamine comprising a cyclic ring (A1); and a second component that chemically reacts with the epoxide-functional adduct (E2), the second component comprising a monoamine, diamine, and/or polyamine (A2), wherein the diamine and/or polyamine (A2) is different than the diamine comprising a cyclic ring and/or a polyamine comprising a cyclic ring (A1).

Also disclosed herein is a system for treating a substrate, comprising: a deoxidizing composition comprising a Group IVA metal and/or a Group IVB metal and free fluoride, wherein the deoxidizing composition has a pH of 1.0 to 3.0; and a coating composition comprising: a first component comprising the epoxide-functional adduct (E2) comprising a first reaction product of a reaction mixture comprising an epoxy-containing compound (E1) and a diamine comprising a cyclic ring and/or a polyamine comprising a cyclic ring (A1); and the amine-functional adduct (A3) comprising a second reaction product of a reaction mixture comprising an epoxide-functional adduct (E2) comprising a first reaction product of a reaction mixture comprising an epoxy-containing compound (E1) and a diamine comprising a cyclic ring and/or a polyamine comprising a cyclic ring (A1).

Also disclosed are substrates treated with a system of the present invention.

Also disclosed are protective clothing comprising a substrate treated with a system of the present invention.

Also disclosed are articles comprising a substrate treated with a system of the present invention.

Also disclosed are methods of treating a substrate with a system of the present invention.

Also disclosed herein are methods of forming an article comprising extruding the compositions of the present invention and treating the article with a system of the present invention.

DETAILED DESCRIPTION OF THE INVENTION

For purposes of the following detailed description, it is to be understood that the invention may assume various alternative variations and step sequences, except where expressly specified to the contrary. Moreover, other than in any operating examples, or where otherwise indicated, all numbers such as those expressing values, amounts, percentages, ranges, subranges and fractions may be read as if prefaced by the word "about," even if the term does not expressly appear. Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques. Where a closed or open-ended numerical range is described herein, all numbers, values, amounts, percentages, subranges and fractions within or encompassed by the numerical range are to be considered as being specifically included in and belonging to the original disclosure of this application as if these numbers, values, amounts, percentages, subranges and fractions had been explicitly written out in their entirety.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

As used herein, unless indicated otherwise, a plural term can encompass its singular counterpart and vice versa, unless indicated otherwise. For example, although reference is made herein to "an" epoxy and "a" curing agent, a combination (i.e., a plurality) of these components can be used.

In addition, in this application, the use of "or" means "and/or" unless specifically stated otherwise, even though "and/or" may be explicitly used in certain instances.

As used herein, "including," "containing" and like terms are understood in the context of this application to be synonymous with "comprising" and are therefore open-ended and do not exclude the presence of additional undescribed or unrecited elements, materials, ingredients or method steps. As used herein, "consisting of" is understood in the context of this application to exclude the presence of any unspecified element, ingredient or method step. As used herein, "consisting essentially of" is understood in the context of this application to include the specified elements, materials, ingredients or method steps "and those that do not materially affect the basic and novel characteristic(s)" of what is being described.

As used herein, the terms "on," "onto," "applied on," "applied onto," "formed on," "deposited on," "deposited onto," mean formed, overlaid, deposited, or provided on but not necessarily in contact with the surface. For example, a coating composition "applied onto" a substrate does not preclude the presence of one or more other intervening coating layers of the same or different composition located between the coating composition and the substrate.

As used herein, a "salt" refers to an ionic compound made up of cations and anions and having an overall electrical charge of zero. Salts may be hydrated or anhydrous.

As used herein, "aqueous composition" refers to a solution or dispersion in a medium that comprises predominantly water. For example, the aqueous medium may comprise water in an amount of more than 50 wt. %, or more than 70 wt. % or more than 80 wt. % or more than 90 wt. % or more than 95 wt. % based on the total weight of the medium. That is, the aqueous medium may for example consist substantially of water.

As used herein, the term "dispersion" refers to a two-phase transparent, translucent or opaque system in which particles are in the dispersed phase and an aqueous medium, which includes water, is in the continuous phase.

As used herein, "deoxidizing composition" refers to a composition having a pH of no greater than 3.0 and a free fluoride content of no greater than 50 ppm based on total weight of the deoxidizing composition and that is capable of etching and/or reacting with and chemically altering the substrate surface.

As used herein, "deoxidizing composition bath" or "deoxidizing bath" refers to an aqueous bath containing the deoxidizing composition and that may contain components that are byproducts of the process.

As used herein, "conversion composition" or "pretreatment composition" refers to a composition that is capable of reacting with and chemically altering the substrate surface and binding to it to form a film that affords corrosion protection.

As used herein, "conversion composition bath" or "pretreatment bath" refers to an aqueous bath containing the conversion composition and that may contain components that are byproducts of the process.

As used herein, "seal composition" refers to a composition that is capable of depositing on a substrate surface through chemisorption or physisorption.

As used herein, "seal composition bath" or "seal bath" refers to an aqueous bath containing the seal composition and that may contain components that are byproducts of the process.

As used herein, the terms "Group IIIB metal" or "Group IIIB element" refer to an element that is in Group IIIB of the CAS version of the Periodic Table of the Elements as is shown, for example, in the Handbook of Chemistry and Physics, $63^{rd}$ edition (1983), corresponding to Group 3 in the actual IUPAC numbering.

As used herein, the term "Group IIIB metal compound" refers to compounds that include at least one element that is in Group IIIB of the CAS version of the Periodic Table of the Elements.

As used herein, the terms "Group IVA metal" and "Group IVA element" refer to an element that is in group IVA of the CAS version of the Periodic Table of the Elements as is shown, for example, in the Handbook of Chemistry and Physics, $63^{rd}$ edition (1983), corresponding to Group 14 in the actual IUPAC numbering.

As used herein, the term "Group IVA metal compound" refers to compounds that include at least one element that is in Group IVA of the CAS version of the Periodic Table of the Elements.

As used herein, the terms "Group IVB metal" and "Group IVB element" refer to an element that is in group IVB of the CAS version of the Periodic Table of the Elements as is shown, for example, in the Handbook of Chemistry and Physics, $63^{rd}$ edition (1983), corresponding to Group 4 in the actual IUPAC numbering.

As used herein, the term "Group IVB metal compound" refers to compounds that include at least one element that is in Group IVB of the CAS version of the Periodic Table of the Elements.

As used herein, the terms "Group VB metal" and "Group VB element" refer to an element that is in group VB of the CAS version of the Periodic Table of the Elements as is shown, for example, in the Handbook of Chemistry and Physics, $63^{rd}$ edition (1983), corresponding to Group 5 in the actual IUPAC numbering.

As used herein, the term "Group VB metal compound" refers to compounds that include at least one element that is in Group VB of the CAS version of the Periodic Table of the Elements.

As used herein, the terms "Group VIB metal" and "Group VIB element" refer to an element that is in group VIB of the CAS version of the Periodic Table of the Elements as is shown, for example, in the Handbook of Chemistry and Physics, $63^{rd}$ edition (1983), corresponding to Group 6 in the actual IUPAC numbering.

As used herein, the term "Group VIB metal compound" refers to compounds that include at least one element that is in Group VIB of the CAS version of the Periodic Table of the Elements.

As used herein, the term "Group VIIB metal" and "Group VIIB element" refer to an element that is in group VIIB of the CAS version of the Periodic Table of the Elements as is shown, for example, in the Handbook of Chemistry and Physics, $63^{rd}$ edition (1983), corresponding to Group 7 in the actual IUPAC numbering.

As used herein, the term "Group VIIB metal compound" refers to compounds that include at least one element that is in Group VIIB of the CAS version of the Periodic Table of the Elements.

As used herein, the terms "Group IIB metal" and "Group IIB element" refer to an element that is in group XIIB of the CAS version of the Periodic Table of the Elements as is shown, for example, in the Handbook of Chemistry and Physics, $63^{rd}$ edition (1983), corresponding to Group 12 in the actual IUPAC numbering.

As used herein, the term "Group IIB metal compound" refers to compounds that include at least one element that is in Group IIB of the CAS version of the Periodic Table of the Elements.

As used herein, "monoamine" refers to an organic compound having one amino functional group.

As used herein, "diamine" refers to an organic compound having two amino functional groups.

As used herein, "polyamine" refers to an organic compound having more than two amino functional groups.

As used herein, "amino functional group" refers to a functional group comprising a nitrogen atom attached by a single bond to a hydrogen atom(s), an alkyl group(s), and/or an aryl group(s).

As used herein, "epoxide functional group" refers to a functional group comprising a cyclic ether with a three-atom ring.

As used herein, "amine hydrogen" refers to the number of active hydrogens directly bonded to the nitrogen atom of an amine- or other nitrogen-containing functional group. "Active hydrogens" refer to hydrogens that can be displaced when the amine- or nitrogen-containing functional group reacts as a nucleophile with an appropriate electrophile and can be determined, for example, by the Zerewitinoff test. Active hydrogens on all accelerators and curing agents (e.g., dicyandiamide and diamines and/or polyamines) were included in the amine hydrogens of the adducts and compositions of the present invention.

As used herein, the term "epoxide-functional adduct" or "E2" refers to a reaction product comprising the residue of an epoxy-containing compound (E1) and a diamine comprising a cyclic ring and/or a polyamine comprising a cyclic ring (A1), wherein the epoxide functionality of E1 is in molar excess relative to the amine hydrogen functionality of A1.

As used herein, the term "amine-functional adduct" or "A3" refers to a reaction product comprising the residue of an epoxide-functional adduct (E2) and a monoamine, a diamine, and/or a polyamine (A2) wherein the diamine and/or polyamine is different from a diamine comprising a cyclic ring and/or a polyamine comprising a cyclic ring (A1), wherein the amine hydrogen functionality of A2 is in molar excess relative to the epoxide functionality of E2.

As used herein, a "coating composition" refers to a composition, e.g., a solution, mixture, or a dispersion, that, in an at least partially dried or cured state, is capable of producing a film, layer, or the like on at least a portion of a substrate surface.

As used herein, a "seal" or a "sealant" or compositions thereof refers to a coating composition, e.g., a solution, mixture, or a dispersion, that, in an at least partially dried or cured state, has the ability to resist atmospheric conditions and particulate matter, such as moisture and temperature and at least partially block the transmission of materials, such as particulates, water, fuel, or other liquids and gasses.

As used herein, the term "structural adhesive" means an adhesive producing a load-bearing joint having both a lap shear strength of at least 20.0 MPa, measured according to ASTM D1002-10 using 2024-T3 aluminum substrate of 1.6 mm thickness, as measured by an INSTRON 5567 machine in tensile mode with a pull rate of 1.3 mm per minute.

As defined herein, a "2K" or "two-component" coating composition refers to a composition in which at least a portion of the reactive components readily react and at least partially cure when mixed without activation from an external energy source, such as at ambient conditions. One of skill in the art understands that the two components of the coating composition are stored separately from each other and mixed just prior to application of the coating composition. As described in more detail below, the 2K coating compositions disclosed herein may be subjected to a curing process wherein (1) at least a portion of the first component and the second component chemically react when mixed at ambient conditions to at least partially cure the coating composition without activation from an external energy source, optionally followed by (2) the application of an external energy source to the coating composition to further cure the coating composition, such as a two-step curing process described herein. External energy sources that may be used to promote the curing reaction (i.e., the crosslinking of the epoxy component and the curing agent) include, for example, radiation (i.e., actinic radiation) and/or heat, such as by baking in an oven and/or forced hot air.

As further defined herein, ambient conditions generally refer to room temperature and humidity conditions or temperature and humidity conditions that are typically found in the area in which the coating composition is being applied to a substrate, e.g., at 10° C. to 40° C. and 5% to 80% relative humidity.

As used herein, "Mw" refers to the weight average molecular weight, for example the theoretical value as determined by Gel Permeation Chromatography using Waters 2695 separation module with a Waters 410 differential refractometer (RI detector) and polystyrene standards, tetrahydrofuran (THF) used as the eluent at a flow rate of 1 ml min', and two PL Gel Mixed C columns used for separation.

As used herein, the term "accelerator" means a substance that increases the rate or decreases the activation energy of a chemical reaction. An accelerator may be either a "catalyst," that is, without itself undergoing any permanent chemical change, or may be reactive, that is, capable of chemical reactions and includes any level of reaction from partial to complete reaction of a reactant.

As used herein, the terms "latent" or "blocked" or "encapsulated", when used with respect to a curing agent or an accelerator, means a molecule or a compound that is activated by an external energy source prior to reacting (i.e., crosslinking) or having a catalytic effect, as the case may be. For example, an accelerator may be in the form of a solid at room temperature and have no catalytic effect until it is heated and melts or dissolves in the composition, or the latent accelerator may be reversibly reacted with a second compound that prevents any catalytic effect until the reversible reaction is reversed by the application of heat and the second compound is removed, freeing the accelerator to catalyze reactions.

As used herein, the term "curing agent" means any reactive material that can be added to a composition to accelerate curing of the composition (e.g., curing of a polymer). The term "reactive" when used with respect to the curing agent means capable of chemical reactions and includes any level of reaction from partial to complete reaction of a reactant.

As used herein, the term "cure", "cured" or similar terms, as used in connection with the composition described herein, means that at least a portion of the components that form the composition are cross-linked to form a coating, film, layer, or bond. Additionally, curing of the composition refers to subjecting said composition to curing conditions (e.g., elevated temperature, lowered activation energy through catalytic activity, etc.) leading to the reaction of the reactive functional groups of the components of the composition, and resulting in the crosslinking of the components of the composition and formation of an at least partially cured or gelled coating. As used herein, the term "at least partially cured" with respect to a coating refers to a coating formed by subjecting the composition to curing conditions such that a chemical reaction of at least a portion of the reactive groups of the components of the composition occurs to form a coating, film, layer, or bond. A coating composition may be considered to be "at least partially cured" if it has a lap shear strength of greater than 0.2 MPa measured according to ASTM D1002-10 by using an INSTRON 5567 machine in tensile mode with a pull rate of 1.3 mm per minute. As discussed in more detail below, the coating composition may also be subjected to a two-step curing process such that a substantially complete cure is attained and wherein further exposure to curing conditions results in no significant further improvement in the coating properties such as, for example, increased lap shear strength.

As used herein, unless indicated otherwise, the term "substantially free" means that a particular material is not purposefully added to a mixture or composition, respectively, and is only present as an impurity in a trace amount of less than 5% by weight based on a total weight of the mixture or composition, respectively. As used herein, unless indicated otherwise, the term "essentially free" means that a particular material is only present in an amount of less than 2% by weight based on a total weight of the mixture or composition, respectively. As used herein, unless indicated otherwise, the term "completely free" means that a mixture or composition, respectively, does not comprise a particular material, i.e., the mixture or composition comprises 0% by weight of such material.

As used herein, the term "glass transition temperature" ("Tg") refers to the temperature at which an amorphous material, such as a glass or a high molecular weight polymer, changes from a brittle vitreous state to a plastic or rubbery state or from a plastic or rubbery state to a brittle vitreous state. Tg values as used herein may be determined, for example, by the Fox Equation.

Systems

The present invention is directed to a system for treating a substrate comprising, or consisting essentially of, or consisting of, a deoxidizing composition and a coating composition.

The deoxidizing composition may comprise, or consist essentially of, or consist of, a Group IVA metal and/or a Group IVB metal and free fluoride, wherein the deoxidizing composition has a pH of 1.0 to 3.0.

The coating composition may comprise, or consist essentially of, or consist of, a first component comprising, or consisting essentially of, or consisting of, an epoxy-containing compound (E1), and a second component that chemically reacts with the epoxy-containing compound (E1), the second component comprising, or consisting essentially of, or consisting of, an amine-functional adduct (A3). The amine-functional adduct (A3) may comprise, or consist essentially of, or consist of, a second reaction product of a reaction mixture comprising, or consisting essentially of, or consisting of, an epoxide-functional adduct (E2). The epoxide-functional adduct (E2) may comprise, or consist essentially of, or consist of, a first reaction product of a reaction mixture comprising an epoxy-containing compound (E1) and a diamine comprising a cyclic ring and/or a polyamine comprising a cyclic ring (A1).

The coating composition may comprise, or consist essentially of, or consist of, a first component comprising, or consisting essentially of, or consisting of, an epoxide-functional adduct (E2) and a second component that chemically reacts with the epoxide-functional adduct (E2), the second component comprising, or consisting essentially of, or consisting of, a monoamine, diamine, and/or polyamine (A2). The epoxide-functional adduct (E2) may comprise, or consist essentially of, or consist of, a first reaction product of a reaction mixture comprising, or consisting essentially of, or consisting of, an epoxy-containing compound (E1) and a diamine comprising, or consisting essentially of, or consisting of a cyclic ring and/or a polyamine comprising a cyclic ring (A1). The diamine and/or polyamine (A2) may be different than the diamine comprising a cyclic ring and/or a polyamine comprising a cyclic ring (A1).

The coating composition also may comprise, or consist essentially of, or consist of, an epoxide-functional adduct (E2) and an amine-functional adduct A3. The epoxide-functional adduct E2 may comprise, or consist essentially of, or consist of, a first reaction product of a reaction mixture comprising an epoxy-containing compound (E1) and a diamine comprising a cyclic ring and/or a polyamine comprising a cyclic ring (A1). The amine-functional adduct (A3) may comprise, or consist essentially of, or consist of, a second reaction product of a reaction mixture comprising, or consisting essentially of, or consisting of, an epoxide-functional adduct (E2) comprising, or consisting essentially of, or consisting of, a first reaction product of a reaction mixture comprising, or consisting essentially of, or consisting of, an epoxy-containing compound (E1) and a diamine comprising, or consisting essentially of, or consisting of, a cyclic ring and/or a polyamine comprising a cyclic ring (A1).

Any of the systems disclosed herein may comprise a cleaner composition. At least a portion of the substrate surface may be cleaned prior to contacting at least a portion of the substrate surface with the deoxidizing composition described above, in order to remove grease, dirt, and/or other extraneous matter. At least a portion of the surface of the substrate may be cleaned by physical and/or chemical means, such as mechanically abrading the surface and/or cleaning/degreasing the surface with commercially available alkaline or acidic cleaning agents that are well known to those skilled in the art. Examples of alkaline cleaners suitable for use in the present invention include Chemkleen™ 166HP, 166M/C, 177, 490MX, 2010LP, and Surface Prep 1 (SP1), Ultrax 32, Ultrax 97, Ultrax 29, Ultrax92D, Ultrax 14, and Ultrax 45, each of which are commercially available from PPG Industries, Inc. (Cleveland, OH), and any of the DFM Series, RECC 1001, and 88X1002 cleaners (commercially available from PRC-DeSoto International, Sylmar, CA), and Turco 4215-NCLT and Ridolene (commercially available from Henkel Technologies, Madison Heights, MI). Examples of acidic cleaners suitable for use in the present invention include Acid Metal Cleaner (AMC) 23, AMC 239, AMC 240, and AMC 533. Such cleaners are often preceded and/or followed by a water rinse, such as with tap water, distilled water, or combinations thereof. In other examples, the cleaner may comprise the homopolymer or copolymer described herein.

Deoxidizing Composition

The system of the present invention may comprise a deoxidizing composition. The deoxidizing composition may comprise a Group IVA metal and/or a Group IVB metal, and free fluoride. The deoxidizing composition may have a pH of 1.0 to 3.0. The deoxidizing composition may be applied as part of a system described herein.

The Group IVA metal may, for example, comprise silicon such as silanes, silicas, silicates, and the like. The Group IVA metal may be provided in the deoxidizing composition in the form of specific compounds of the metals, such as their soluble acids and/or salts. Examples of useful compounds include fluorosilicic acid, ammonium and alkali metal fluorosilicates, and the like, including by way of non-limiting example, hexafluorosilicate.

The Group IVA metal, if present at all, may be present in the deoxidizing composition in an amount of at least 10 ppm based on total weight of the deoxidizing composition, such as at least 20 ppm, such as at least 50 ppm, and, if present at all, may be present in the deoxidizing composition in an amount of no more than 1000 ppm based on total weight of the deoxidizing composition, such as no more than 500 ppm, such as no more than 250 ppm. The Group IVA metal, if present at all, may be present in the deoxidizing composition in an amount of 10 ppm to 1000 ppm based on total weight of the deoxidizing composition, such as 20 ppm to 500 ppm, such as 50 ppm to 250 ppm.

As stated above, the deoxidizing composition may comprise a Group IVB metal. Optionally, the deoxidizing composition may comprise more than one Group IVB metal. The Group IVB metal may comprise zirconium, titanium, hafnium, or combinations thereof. For example, the Group IVB metal used in the deoxidizing composition may be a compound of zirconium, titanium, hafnium, or a mixture thereof. Suitable compounds of zirconium include, but are not limited to, hexafluorozirconic acid, alkali metal and ammonium salts thereof, ammonium zirconium carbonate, zirconyl nitrate, zirconyl sulfate, zirconium carboxylates and zirconium hydroxy carboxylates, such as zirconium acetate, zirconium oxalate, ammonium zirconium glycolate, ammonium zirconium lactate, ammonium zirconium citrate, zirconium basic carbonate, zirconium tetralkaloids, and mixtures thereof. Suitable compounds of titanium include, but are not limited to, fluorotitanic acid and its salts. A suitable compound of hafnium includes, but is not limited to, hafnium nitrate.

The Group IVB metal, if present at all, may be present in the deoxidizing composition in a total amount of at least 200 ppm based on total weight of the deoxidizing composition, such as at least 250 ppm, such as at least 300 ppm. The Group IVB metal, if present at all, may be present in the deoxidizing composition in a total amount of no more than 5000 ppm based on total weight of the deoxidizing composition, such as no more than 4000 ppm, such as no more than 3500 ppm. The Group IVB metal may be present in the deoxidizing composition in a total amount of 200 ppm to 5000 ppm based on total weight of the deoxidizing composition, such as 250 ppm to 4000 ppm, such as 300 ppm to 3500 ppm.

The deoxidizing composition also may comprise a Group IA metal such as lithium. According to the invention, the source of Group IA metal in the deoxidizing composition may be in the form of a salt. Non-limiting examples of suitable lithium salts include lithium nitrate, lithium sulfate, lithium fluoride, lithium chloride, lithium hydroxide, lithium carbonate, lithium iodide, and combinations thereof.

The Group IA metal may be present in the deoxidizing composition in an amount of at least 2 ppm based on a total weight of the deoxidizing composition, such as at least 5 ppm, such as at least 25 ppm, such as at least 75 ppm, and in some instances, may be present in an amount of no more than 500 ppm based on a total weight of the deoxidizing composition, such as no more than 250 ppm, such as no more than 125 ppm, such as no more than 100 ppm. The Group IA metal may be present in the deoxidizing composition in an amount of 2 ppm to 500 ppm based on a total weight of the deoxidizing composition, such as 5 ppm to 250 ppm, such as 5 ppm to 125 ppm, such as 25 ppm to 125 ppm, such as 75 ppm to 100 ppm, such as 5 ppm to 25 ppm.

The deoxidizing composition may also comprise a Group VIB metal. In an example, the Group VIB metal may be molybdenum. According to the present invention, the source of Group VIB metal in the deoxidizing composition may be in the form of a salt. Non-limiting examples of suitable molybdenum salts include sodium molybdate, lithium molybdate, calcium molybdate, potassium molybdate, ammonium molybdate, molybdenum chloride, molybdenum acetate, molybdenum sulfamate, molybdenum formate, molybdenum lactate, and combinations thereof.

According to the present invention, the Group VIB metal may be present in the deoxidizing composition in an amount of at least 5 ppm based on a total weight of the deoxidizing composition, such as at least 25 ppm, such as 100 ppm, and in some instances, may be present in the deoxidizing composition in an amount of no more than 500 ppm based on total weight of the deoxidizing composition, such as no more than 250 ppm, such as no more than 150 ppm. According to the present invention, the Group VIB metal may be present in the deoxidizing composition in an amount of 5 ppm to 500 ppm based on total weight of the deoxidizing composition, such as 25 ppm to 250 ppm, such as 100 ppm to 150 ppm, such as 40 ppm to 120 ppm.

The deoxidizing composition may further comprise an anion that may be suitable for forming a salt with any of the Group IA, Group IVA, Group IVB, and Group VIB metals described above, such as a halogen, a nitrate, a sulfate, a silicate (orthosilicates and metasilicates), carbonates, hydroxides, and the like.

The deoxidizing composition also may comprise an electropositive metal. As used herein, the term "electropositive metal" refers to metal ions that will be reduced by the metal substrate being treated when the deoxidizing composition contacts the surface of the metallic substrate. As will be appreciated by one skilled in the art, the tendency of chemical species to be reduced is called the reduction potential, is expressed in volts, and is measured relative to the standard hydrogen electrode, which is arbitrarily assigned a reduction potential of zero. The reduction potential for several elements is set forth in Table 1 below (according to the CRC 82$^{nd}$ Edition, 2001-2002). An element or ion is more easily reduced than another element or ion if it has a voltage value, E*, in the following table, that is more positive than the elements or ions to which it is being compared.

TABLE 1

Reduction Potentials

| Element | Reduction half-cell reaction | Voltage, E* |
|---|---|---|
| Potassium | $K^+ + e \rightarrow K$ | −2.93 |
| Calcium | $Ca^{2+} + 2e \rightarrow Ca$ | −2.87 |
| Sodium | $Na^+ + e \rightarrow Na$ | −2.71 |
| Magnesium | $Mg^{2+} + 2e \rightarrow Mg$ | −2.37 |
| Aluminum | $Al^{3+} + 3e \rightarrow Al$ | −1.66 |
| Zinc | $Zn^{2+} + 2e \rightarrow Zn$ | −0.76 |
| Iron | $Fe^{2+} + 2e \rightarrow Fe$ | −0.45 |

TABLE 1-continued

| Reduction Potentials | | |
|---|---|---|
| Element | Reduction half-cell reaction | Voltage, E* |
| Nickel | $Ni^{2+} + 2e \rightarrow Ni$ | −0.26 |
| Tin | $Sn^{2+} + 2e \rightarrow Sn$ | −0.14 |
| Lead | $Pb^{2+} + 2e \rightarrow Pb$ | −0.13 |
| Hydrogen | $2H^{+} + 2e \rightarrow H$ | −0.00 |
| Copper | $Cu^{2+} + 2e \rightarrow Cu$ | 0.34 |
| Mercury | $Hg_2^{2+} + 2e \rightarrow 2Hg$ | 0.80 |
| Silver | $Ag^{+} + e \rightarrow Ag$ | 0.80 |
| Gold | $Au^{3+} + 3e \rightarrow Au$ | 1.50 |

Thus, as will be apparent, when the metal substrate comprises one of the materials listed below, such as cold rolled steel, hot rolled steel, steel coated with zinc metal, zinc compounds, or zinc alloys, hot-dipped galvanized steel, galvanealed steel, steel plated with zinc alloy, aluminum alloys, aluminum plated steel, aluminum alloy plated steel, suitable electropositive metals for deposition thereon include, for example, nickel, copper, silver, and gold, as well as mixtures thereof.

When the electropositive metal is or includes copper, both soluble and insoluble compounds may serve as the source of copper in the pretreatment composition. For example, the supplying source of copper ions in the pretreatment composition may be a water soluble copper compound. Specific examples of such compounds include, but are not limited to, copper sulfate, copper nitrate, copper pyrophosphate, copper thiocyanate, copper bromide, copper oxide, copper hydroxide, copper chloride, copper fluoride, copper fluorosilicate, copper fluoroborate and copper iodate, as well as copper salts of carboxylic acids in the homologous series formic acid to decanoic acid.

The electropositive metal, if present at all, may be present in the deoxidizing composition in an amount of at least 2 ppm based on the total weight of the deoxidizing composition, such as at least 4 ppm, such as at least 6 ppm, such as at least 8 ppm, such as at least 10 ppm. The electropositive metal, if present at all, may be present in the deoxidizing composition in an amount of no more than 100 ppm based on the total weight of the deoxidizing composition, such as no more than 80 ppm, such as no more than 60 ppm, such as no more than 40 ppm, such as no more than 20 ppm. The electropositive metal, if present at all, may be present in the deoxidizing composition in an amount of from 2 ppm to 100 ppm based on the total weight of the deoxidizing composition, such as from 4 ppm to 80 ppm, such as from 6 ppm to 60 ppm, such as from 8 ppm to 40 ppm, such as from 10 ppm to 20 ppm.

A source of fluoride may be present in the deoxidizing composition described herein. The fluoride may be present in the deoxidizing composition as either free fluoride and/or bound fluoride. The free fluoride may be derived from a compound or complex comprising the Group IVA and/or the Group IVB metals described above and/or may be derived from a compound or complex other than a compound or complex comprising the Group IVA and/or the Group IVB metals. As used herein the amount of fluoride disclosed or reported in the deoxidizing composition is referred to as "free fluoride," that is, fluoride present in the deoxidizing composition that is not bound to metal ions or hydrogen ions, as measured in parts per million of fluoride. Free fluoride is defined herein as being able to be measured using, for example, an Orion Dual Star Dual Channel Benchtop Meter equipped with a fluoride ion selective electrode ("ISE") available from Thermoscientific, the Symphony® Fluoride Ion Selective Combination Electrode supplied by VWR International, or similar electrodes. See, e.g., Light and Cappuccino, *Determination of fluoride in toothpaste using an ion-selective electrode*, J. Chem. Educ., 52:4, 247-250, April 1975. The fluoride ISE may be standardized by immersing the electrode into solutions of known fluoride concentration and recording the reading in millivolts, and then plotting these millivolt readings in a logarithmic graph. The millivolt reading of an unknown sample can then be compared to this calibration graph and the concentration of fluoride determined. Alternatively, the fluoride ISE can be used with a meter that will perform the calibration calculations internally and thus, after calibration, the concentration of the unknown sample can be read directly.

The free fluoride of the deoxidizing composition may be present in an amount of at least 2 ppm based on a total weight of the deoxidizing composition, such as at least 5 ppm free fluoride, such as at least 10 ppm free fluoride. The free fluoride of the deoxidizing composition may be present in an amount of no more than 100 ppm based on a total weight of the deoxidizing composition, such as no more than 40 ppm free fluoride, such as no more than 25 ppm free fluoride. The free fluoride of the deoxidizing composition may be present in an amount of 2 ppm free fluoride to 100 ppm free fluoride based on a total weight of the deoxidizing composition, such as 5 ppm free fluoride to 40 ppm free fluoride, such as 10 ppm free fluoride to 25 ppm free fluoride.

Optionally, the deoxidizing composition may further comprise a source of phosphate ions. For clarity, when used herein, "phosphate ions" refers to phosphate ions that derive from or originate from inorganic phosphate compounds. For example, in some instances, phosphate ions may be present in an amount of greater than 5 ppm based on total weight of the deoxidizing composition, such as 10 ppm, such as 20 ppm. In some instances, phosphate ions may be present in an amount of no more than 60 ppm based on total weight of the deoxidizing composition, such as no more than 40 ppm, such as no more than 30 ppm. In some instances, phosphate ions may be present in an amount of from 5 ppm to 60 ppm based on total weight of the deoxidizing composition, such as from 10 ppm to 40 ppm, such as from 20 ppm to 30 ppm.

Optionally, the deoxidizing composition may comprise a homopolymer or copolymer comprising a phosphorous-containing monomeric subunit m1 and optionally a non-phosphorous-containing monomeric subunit m2. Any of the monomeric subunits m1 and m2 described herein may be useful in the deoxidizing composition.

The copolymer may be a dipolymer, a terpolymer, or a higher polymer. The homopolymer or copolymer may be a statistical or a block homopolymer or copolymer and may be formed by radical continuous or batchwise polymerization.

As used herein, the term "(meth)acrylic acid," when used with respect to the monomeric units, refers to acrylic and/or methacrylic acid subunits.

As used herein, the term "(meth)acrylate" refers to an acrylate, a methacrylate, or a mixture of acrylate and methacrylate.

As used herein, the terms "homopolymer" and "homopolymer comprising monomeric subunits m1," when used with respect to the homopolymer disclosed herein, refers to a homopolymer resulting from the polymerization of one kind of monomer m1, wherein the homopolymer does not comprise any other monomeric subunits.

As used herein, the terms "copolymer," when used with respect to the present invention, refers to a dipolymer or higher copolymer resulting from the polymerization of at least one kind of monomer m1 and at least one kind of monomer m2 or at least two kinds of monomers m1. For clarity, "copolymer" includes dipolymers, terpolymers, and higher copolymers.

As used herein, the terms "dipolymer," when used with respect to the copolymer of the present invention, refers to a copolymer resulting from the polymerization of one kind monomer m1 and one kind of monomer m2 or two kinds of monomers m1.

As used herein, the terms "terpolymer," when used with respect to the present invention, refers to a copolymer resulting from the polymerization of three monomeric subunit types, where at least one monomer is m1.

Suitable examples of the phosphorous-containing monomeric subunits m1 include organophosphorous compounds containing phosphates, phosphate salts, and/or phosphate esters, phosphonic acids, phosphonic acid salts, and/or phosphonic esters, and/or phosphinic acids, phosphinic acid salts, and/or phosphinic esters. Examples include, but are not limited to, vinyl phosphonic acid, dimethyl vinyl phosphonate, diethyl vinyl phosphonate, or other dialkyl vinyl phosphonates, maleic acid dimethyl phosphonate, maleic acid diethyl phosphonate, phosphate-, phosphonate-, or phosphinate-substituted methacrylate or acrylate monomers, phosphate-, phosphonate-, or phosphinate-substituted acrylamide monomers, or other monomers containing phosphorus-containing substituents and a polymerizable bond.

Suitable examples of phosphorous-containing monomeric subunits m1 include those comprising the structure of Formula I:

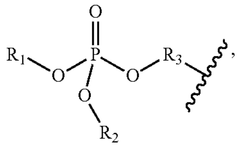

wherein $R_1$ and $R_2$ comprise hydrogen, a cation, an alkyl radical, an aryl radical, or a phosphoester group, and $R_3$ comprises an organic linking group terminating in an atom that is covalently bonded to an atom present in the addition polymer backbone. The organic linking group may comprise at least one carbon atom, and may comprise additional functional groups, such as, for example, one or more ether, amine, or hydroxyl functional groups, among other functional groups, and at least a portion of the organic linking group may comprise a polyether if at least two ether groups are present. The organic linking group may comprise an organic chain, and the organic chain may terminate in a carbon atom on either side of the chain.

Other suitable examples of phosphorous-containing monomeric subunits m1 include those comprising the structure of Formula II:

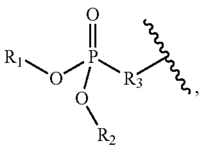

wherein $R_1$ and $R_2$ comprises hydrogen, a cation, an alkyl radical, an aryl radical, or a phosphoester group, wherein $R_1$ and $R_2$ may be the same or different, and wherein $R_3$ comprises an organic linking group terminating in an atom that is covalently bonded to a carbon atom present in the addition polymer backbone. The organic linking group may comprise at least one carbon atom, and may comprise additional functional groups, such as, for example, one or more ether, amine, or hydroxyl functional groups, among other functional groups, and at least a portion of the organic linking group may comprise a polyether if at least two ether groups are present. The organic linking group may comprise an organic chain, and the organic chain may terminate in a carbon atom on either side of the chain.

Further suitable examples of phosphorous-containing monomeric subunits m1 include those comprising the structure of Formula III:

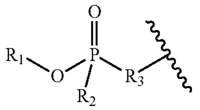

wherein $R_1$ comprises hydrogen, a cation, an alkyl radical, an aryl radical, or a phosphoester group, $R_2$ comprises hydrogen, an alkyl radical, or an aryl radical, and $R_3$ comprises an organic linking group terminating in an atom that is covalently bonded to an atom present in the addition polymer backbone. The organic linking group may comprise at least one carbon atom, and may comprise additional functional groups, such as, for example, one or more ether, amine, or hydroxyl functional groups, among other functional groups, and at least a portion of the organic linking group may comprise a polyether if at least two ether groups are present. The organic linking group may comprise an organic chain, and the organic chain may terminate in a carbon atom on either side of the chain.

Further suitable examples of phosphorus-containing monomeric subunits m1 include those comprising a polymerizable double bond and a phosphorus containing functional group such as a phosphine, phosphine oxide, phosphonium salt, or phosphate amide.

Monomeric subunit m2 may be any non-phosphorous-containing monomer that is capable of co-polymerizing with monomer subunits m1. For example, m2 may be a carboxylic acid- or anhydride-containing monomeric subunit.

Monomeric subunit m2 may be an acid or anhydride functional ethylenically unsaturated monomer. Suitable examples of monomeric subunits m2 include methacrylic acid, acrylic acid, maleic acid or its anhydride, fumaric acid, itaconic acid or its anhydride.

Monomeric subunit m2 also may be a (meth)acrylate. Suitable examples of (meth)acrylate monomeric subunits m2 include alkyl esters of (meth)acrylic acid. Non-limiting examples of alkyl esters of (meth)acrylic acid include methyl (meth)acrylate, ethyl (meth)acrylate and propyl (meth)acrylate. Other suitable examples of monomeric subunit m2 include (meth)acrylamides, such as N-isopropyl acrylamide, esters of maleic acid, fumaric acid, or itaconic acid, vinyl monomers such as styrenics, such as styrene sulfonic acid, vinyl ethers, or other monomers containing a polymerizable double bond, such as N-vinylpyrrolidone.

In an example, the copolymer disclosed herein may include a dipolymer comprising subunits m1 and m2 and having the structure of Formula IV:

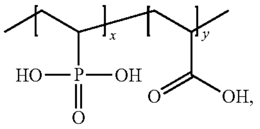

where x varies from greater than 5 to 100 mol % and y varies from 0 to 95 mol %.

Monomeric subunit m1 may be present in the homopolymer or copolymer in an amount of at least 5 molar percent based on total molarity of the homopolymer or copolymer, such as at least 20 molar percent, such as at least 40 molar percent, and may, in some instances, be present in the homopolymer or copolymer an amount of 100 molar percent based on total molarity of the homopolymer or copolymer, such as no more than 80 molar percent, such as no more than 70 molar percent. Monomeric subunit m1 may be present in the homopolymer or copolymer in an amount of 5 molar percent to 100 molar percent based on total molarity of the homopolymer or copolymer, such as 20 molar percent to 80 molar percent, such as 40 molar percent to 70 molar percent.

Monomeric subunit m2 may be absent from the homopolymer or copolymer. Monomeric subunit m2 may be present in the homopolymer or copolymer disclosed herein, if at all, in an amount of at least 0.1 molar percent based on total molarity of the homopolymer or copolymer, such as at least 20 molar percent, such as at least 30 molar percent, and may, in some instances, be present in the homopolymer or copolymer an amount of 95 molar percent based on total molarity of the homopolymer or copolymer, such as at least 80 molar percent, such as at least 30 molar percent. Monomeric subunit m2, if present at all, may be present in the homopolymer or copolymer in an amount of 0.1 molar percent to 95 molar percent based on total molarity of the homopolymer or copolymer, such as 20 molar percent to 80 molar percent, such as 30 molar percent to 60 molar percent.

The homopolymer or copolymer, if present at all, may be present in the deoxidizing composition in an amount of at least 100 ppm based on total weight of the deoxidizing composition, such as at least 150 ppm, such as at least 300 ppm, such as at least 400 ppm, and may, in some instances, be present in the deoxidizing composition in an amount of no more than 3000 ppm based on total weight of the deoxidizing composition, such as no more than 1000 ppm, such as no more than 750 ppm, such as no more than 600 ppm. The homopolymer or copolymer, if present at all, may be present in the deoxidizing composition in an amount of 100 ppm to 3000 ppm based on total weight of the deoxidizing composition, such as 150 ppm to 1000 ppm, such as 300 ppm to 750 ppm, such as 400 ppm to 600 ppm.

The pH of the deoxidizing composition may be at least 1.0, such as at least 2.0, and in some instances may be 3.0 or less, such as 2.5 or less. The pH of the deoxidizing composition may, in some instances, be 1.0 to 3.0, such as 2.0 to 2.5, and may be adjusted using, for example, any acid and/or base as is necessary. The pH of the deoxidizing composition may be maintained through the inclusion of an acidic material, including water soluble and/or water dispersible acids, such as nitric acid, sulfuric acid, and/or phosphoric acid. The pH may be maintained through the inclusion of a basic material, including water soluble and/or water dispersible bases, such as sodium hydroxide, sodium carbonate, potassium hydroxide, ammonium hydroxide, ammonia, and/or amines such as triethylamine, methylethyl amine, or mixtures thereof.

The deoxidizing composition may comprise a carrier, such as an aqueous medium, so that the composition is in the form of a solution or dispersion of the metals in the carrier. The deoxidizing composition optionally may contain other materials such as nonionic surfactants and auxiliaries conventionally used in the art of substrate protection. In the aqueous medium, water dispersible organic solvents, for example, alcohols with up to about 8 carbon atoms such as methanol, isopropanol, and the like, may be present; or glycol ethers such as the monoalkyl ethers of ethylene glycol, diethylene glycol, or propylene glycol, and the like. When present, water dispersible organic solvents are typically used in amounts up to about ten percent by volume based on the total volume of aqueous medium.

Other optional materials that may be included in the deoxidizing compositions disclosed herein include surfactants that function as defoamers or substrate wetting agents. Anionic, cationic, amphoteric, and/or nonionic surfactants may be used. Defoaming surfactants may optionally be present at levels up to 1 weight percent, such as up to 0.1 percent by weight, and wetting agents are typically present at levels up to 2 percent, such as up to 0.5 percent by weight based on the total weight of the composition.

Optionally, the deoxidizing compositions described herein may exclude chromium or chromium-containing compounds. As used herein, the term "chromium-containing compound" refers to materials that include trivalent and/or hexavalent chromium. Non-limiting examples of such materials include chromic acid, chromium trioxide, chromic acid anhydride, dichromate salts, such as ammonium dichromate, sodium dichromate, potassium dichromate, and calcium, barium, magnesium, zinc, cadmium, strontium dichromate, chromium(III) sulfate, chromium(III) chloride, and chromium(III) nitrate. When a composition or a material deposited on a substrate surface by contacting the substrate surface is substantially free, essentially free, or completely free of chromium, this includes chromium in any form, such as, but not limited to, the trivalent and hexavalent chromium-containing compounds listed above.

Thus, optionally, the deoxidizing compositions disclosed herein and/or material deposited on a substrate surface by any of these compositions may be substantially free, may be essentially free, and/or may be completely free of one or more of any of the elements or compounds listed in the preceding paragraph. A composition or a material deposited on a substrate surface by a composition that is substantially free of chromium or chromium-containing compounds means that chromium or derivatives thereof are not intentionally added, but may be present in trace amounts, such as because of impurities or unavoidable contamination from the environment. In other words, the amount of material is so small that it does not affect the properties of the composition or deposited material; in the case of chromium, this may further include that the element or compounds thereof are not present in the composition and/or deposited material in such a level that it causes a burden on the environment. The term "substantially free" means that the composition and/or deposited material contain less than 10 ppm of any or all of the elements or compounds listed in the preceding paragraph based on total weight of the composition or the total weight of a coating formed on the substrate, if any at all. The term "essentially free" means that the composition and/or deposited material contain less than 1 ppm of any or all of the elements or compounds listed in the preceding paragraph, if any at all. The term "completely free" means that the compositions and/or deposited material contain less than 1 ppb of any or all of the elements or compounds listed in the preceding paragraph, if any at all.

Optionally, the deoxidizing compositions described herein may exclude phosphate ions or phosphate-containing compounds and/or the formation of sludge, such as aluminum phosphate, iron phosphate, and/or zinc phosphate, formed in the case of using a treating agent based on zinc phosphate. As used herein, "phosphate-containing compounds" include compounds containing the element phosphorous such as ortho phosphate, pyrophosphate, metaphosphate, tripolyphosphate, organophosphonates, and the like, and can include, but are not limited to, monovalent, divalent, or trivalent cations such as: sodium, potassium, calcium, zinc, nickel, manganese, aluminum and/or iron. When a composition and/or a material deposited on a substrate surface by deposition of the composition is substantially free, essentially free, or completely free of phosphate, this includes phosphate ions or compounds containing phosphate in any form.

Thus, the deoxidizing compositions and/or a material deposited on a substrate surface by deposition of the compositions may be substantially free, or in some cases may be essentially free, or in some cases may be completely free, of one or more of any of the ions or compounds listed in the preceding paragraph. A composition and/or deposited material that is substantially free of phosphate means that phosphate ions or compounds containing phosphate are not intentionally added, but may be present in trace amounts, such as because of impurities or unavoidable contamination from the environment. In other words, the amount of material is so small that it does not affect the properties of the composition; this may further include that phosphate is not present in the composition and/or deposited materials in such a level that they cause a burden on the environment. The term "substantially free" means that a compositions and/or deposited material contain less than 5 ppm of any or all of the phosphate anions or compounds listed in the preceding paragraph based on total weight of the composition or the coating formed on the substrate, respectively, if any at all. The term "essentially free" means that the composition and/or deposited material less than 1 ppm of any or all of the phosphate anions or compounds listed in the preceding paragraph. The term "completely free" means that the composition and/or deposited material contain less than 1 ppb of any or all of the phosphate anions or compounds listed in the preceding paragraph, if any at all.

Coating Compositions

The present invention also is directed to an epoxide-functional adduct (E2) comprising, or consisting essentially of, or consisting of, a first reaction product of reaction mixture comprising, or consisting essentially of, or consisting of, (a) an epoxy-containing compound (E1) and (b) a diamine comprising a cyclic ring and/or a polyamine comprising a cyclic ring (A1).

The present invention is also directed to an amine-functional adduct (A3) comprising, or consisting essentially of, or consisting of, a second reaction product of a reaction mixture comprising, or consisting essentially of, or consisting of, an epoxy-functional adduct (E2) and an amine (A2), wherein the amine (A2) is different than the diamine comprising a cyclic ring and/or the polyamine comprising a cyclic ring (A1).

The present invention also is directed to a coating composition comprising, or consisting essentially of, or consisting of: a first component comprising, or consisting essentially of, or consisting of, an epoxy-containing compound (E1); and a second component that chemically reacts with the epoxy-containing compound, the second component comprising, or consisting essentially of, or consisting of, an amine-functional adduct (A3).

The present invention also is directed to a coating composition comprising, or consisting essentially of, or consisting of: a first component comprising an epoxide-functional adduct (E2); and a second component that chemically reacts with the epoxide-functional adduct (E2), the second component comprising a monoamine, diamine, or polyamine (A2), wherein the diamine and the polyamine are different than the diamine containing an aromatic ring and/or a polyamine containing an aromatic ring (A1).

The present invention also is directed to a coating composition comprising, or consisting essentially of, or consisting of: a first component comprising an epoxide-functional adduct (E2); and a second component that chemically reacts with the epoxide-functional adduct (E2), the second component comprising an amine-functional adduct (A3).

As discussed above, the first component of the composition may comprise an epoxy-containing compound (E1). Suitable epoxy-containing compounds that may be used include monoepoxides, polyepoxides, or combinations thereof.

Suitable monoepoxides that may be used include glycidol, monoglycidyl ethers of alcohols and phenols, such as phenyl glycidyl ether, n-butyl glycidyl ether, cresyl glycidyl ether, isopropyl glycidyl ether, glycidyl versatate, for example, CARDURA E available from Shell Chemical Co., and glycidyl esters of monocarboxylic acids such as glycidyl neodecanoate, and mixtures of any of the foregoing.

Useful epoxy-containing compounds (E1) that can be used include polyepoxides (having an epoxy functionality greater than 1), epoxy adducts, or combinations thereof. Suitable polyepoxides include polyglycidyl ethers of Bisphenol A, such as Epon® 828 and 1001 epoxy resins, and Bisphenol F polyepoxides, such as Epon® 862, which are commercially available from Hexion Specialty Chemicals, Inc. Other useful polyepoxides include polyglycidyl ethers of polyhydric alcohols, polyglycidyl esters of polycarboxylic acids, polyepoxides that are derived from the epoxidation of an olefinically unsaturated alicyclic compound, polyepoxides containing oxyalkylene groups in the epoxy molecule, and epoxy novolac resins. Still other non-limiting epoxy components include epoxidized Bisphenol A novolacs, epoxidized phenolic novolacs, epoxidized cresylic novolac, isosorbide diglycidyl ether, triglycidyl p-aminophenol, and triglycidyl p-aminophenol bismaleimide, triglycidyl isocyanurate, tetraglycidyl 4,4'-diaminodiphenylmethane, and tetraglycidyl 4,4'-diaminodiphenylsulphone. The epoxy-containing compound may also comprise a carboxyl-terminated butadiene-acrylonitrile copolymer modified epoxy-containing compound. The epoxy-containing compound may also comprise an epoxy-containing acrylic, such as glycidyl methacrylate.

The epoxy-containing compound (E1) may comprise an epoxy-adduct. The composition may comprise one or more epoxy-adducts. As used herein, the term "epoxy-adduct" refers to a reaction product comprising the residue of an epoxy and at least one other compound that does not include an epoxide functional group. For example, the epoxy-adduct may comprise the reaction product of reactants comprising an epoxy, a polyol, and an anhydride. The term "epoxy-adduct" used with respect to the epoxy-containing compound (E1) is different than the epoxide-functional adduct (E2) described below.

The epoxy used to form the epoxy-adduct may comprise any of the epoxy-containing compounds listed above that may be included in the composition.

The polyol used to form the epoxy-adduct may include diols, triols, tetraols and higher functional polyols. Combinations of such polyols may also be used. The polyols may be based on a polyether chain derived from ethylene glycol, propylene glycol, butylene glycol, hexylene glycol and the like as well as mixtures thereof. The polyol may also be based on a polyester chain derived from ring opening polymerization of caprolactone (referred to as polycaprolactone-based polyols hereinafter). Suitable polyols may also include polyether polyols, polyurethane polyols, polyurea polyols, acrylic polyols, polyester polyols, polybutadiene polyols, hydrogenated polybutadiene polyols, polycarbonate polyols, polysiloxane polyols, and combinations thereof. Polyamines corresponding to polyols may also be used, and in this case, amides instead of carboxylic esters will be formed with the anhydrides.

The polyol may comprise a polycaprolactone-based polyol. The polycaprolactone-based polyols may comprise diols, triols or tetraols terminated with primary hydroxyl groups. Commercially available polycaprolactone-based polyols include those sold under the trade name Capa™ from Perstorp Group, such as, for example, Capa 2054, Capa 2077A, Capa 2085, Capa 2205, Capa 3031, Capa 3050, Capa 3091 and Capa 4101.

The polyol may comprise a polytetrahydrofuran-based polyol. The polytetrahydrofuran-based polyols may comprise diols, triols or tetraols terminated with primary hydroxyl groups. Commercially available polytetrahydrofuran-based polyols include those sold under the trade name Terathane®, such as Terathane® PTMEG 250 and Terathane® PTMEG 650 which are blends of linear diols in which the hydroxyl groups are separated by repeating tetramethylene ether groups, available from Invista. In addition, polyols based on dimer diols sold under the trade names Pripol®, Solvermol™ and Empol®, available from Cognis Corporation, or bio-based polyols, such as the tetrafunctional polyol Agrol 4.0, available from BioBased Technologies, may also be utilized.

The anhydride that may be used to form the epoxy-adduct may comprise any suitable acid anhydride known in the art. For example, the anhydride may comprise hexahydrophthalic anhydride and its derivatives (e.g., methyl hexahydrophthalic anhydride); phthalic anhydride and its derivatives (e.g., methyl phthalic anhydride); maleic anhydride; succinic anhydride; trimelletic anhydride; pyromelletic dianhydride (PMDA); 3,3',4,4'-oxydiphthalic dianhydride (ODPA); 3,3',4,4'-benzophenone tetracarboxylic dianhydride (BTDA); and 4,4'-diphthalic (hexafluoroisopropylidene) anhydride (6FDA).

The epoxy-adduct may comprise a diol, a monoanhydride, and a diepoxy compound, wherein the mole ratio of diol, monoanhydride, and diepoxy compounds in the epoxy-adduct may vary from 0.5:0.8:1.0 to 0.5:1.0:6.0.

The epoxy-adduct may comprise a triol, a monoanhydride, and a diepoxy compound, wherein the mole ratio of triol, monoanhydride, and diepoxy compounds in the epoxy-adduct may vary from 0.5:0.8:1.0 to 0.5:1.0:6.0.

The epoxy-adduct may comprise a tetraol, a monoanhydride, and a diepoxy compound, wherein the mole ratio of tetraol, monoanhydride, and diepoxy compounds in the epoxy-adduct may vary from 0.5:0.8:1.0 to 0.5:1.0:6.0.

Other suitable epoxy-containing compounds (E1) include epoxy-adducts such as epoxy polyesters formed as the reaction product of reactants comprising an epoxy-containing compound, a polyol and an anhydride, as described in U.S. Pat. No. 8,796,361, col. 3, line 42 through col. 4, line 65, the cited portion of which is incorporated herein by reference.

Alternatively, the first component of the compositions disclosed herein also may comprise an epoxide-functional adduct (E2).

Epoxy-containing compounds (E1) useful in forming epoxide-functional adduct (E2) include any of the epoxy-containing compounds described above. Diamines and/or polyamines comprising a cyclic ring (A1) useful in forming the epoxide-functional adduct (E2) include any of those described below.

The diamine and/or polyamine comprising a cyclic ring (A1) may be used in the reaction mixture generating the epoxide-functional adduct (E2) in an amount sufficient to provide a molar ratio of epoxide functional groups from the epoxy-containing compound (E1) to amine-hydrogens from the diamine and/or polyamine (A1) of at least 2:1, such as at least 3:1, such as at least 4:1, such as at least 5:1, such as at least 6:1, and may be present in the epoxide-functional adduct (E2) in an amount sufficient to provide a molar ratio of epoxide functional groups from the epoxy-containing compound (E1) to amine-hydrogens from the diamine and/or polyamine (A1) of no more than 12:1, such as no more than 11:1, such as no more than 10:1, such as no more than 9:1, such as no more than 8:1. The diamine and/or polyamine comprising a cyclic ring (A1) may be used in the reaction mixture generating the epoxide-functional adduct (E2) in an amount sufficient to provide a molar ratio of epoxide functional groups from the epoxy-containing compound (E1) to amine-hydrogens from the diamine and/or polyamine (A1) of 2:1 to 12:1, such as 3:1 to 11:1, such as 4:1 to 10:1, such as 5:1 to 9:1, such as 6:1 to 8:1.

In examples, the epoxy-functional adduct (E2) may be an epoxy-capped polyamine comprising a cyclic ring. For example, E2 may have the following structure (Structure I):

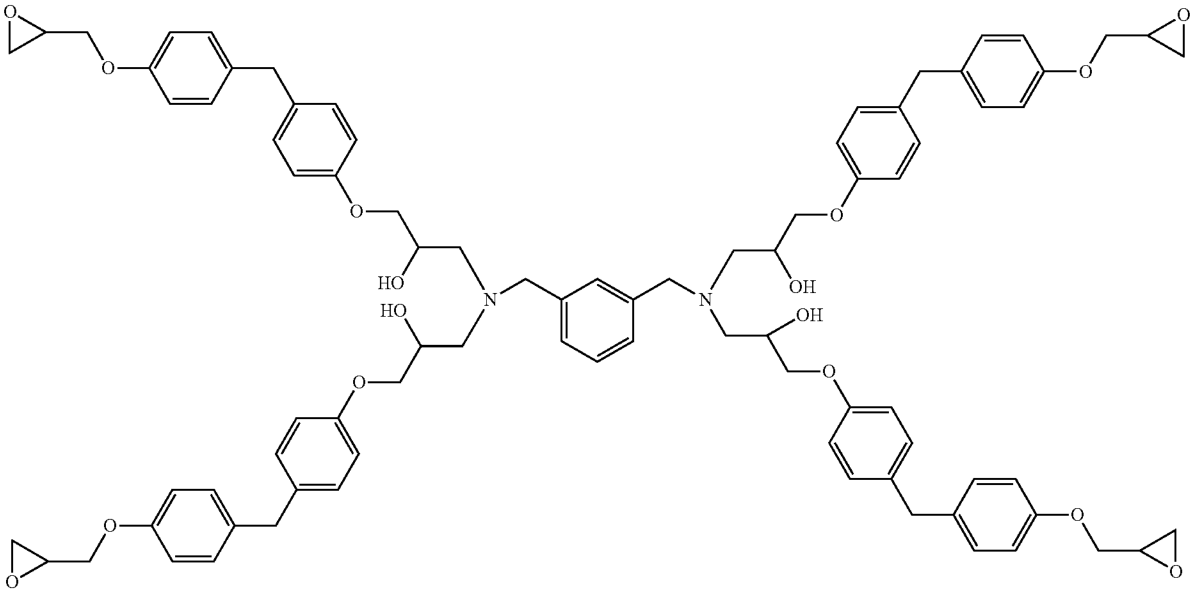 [SMILES: OC(COc1ccc(Cc2ccc(OCC3CO3)cc2)cc1)CN(Cc1cccc(CN(CC(O)COc2ccc(Cc3ccc(OCC4CO4)cc3)cc2)CC(O)COc2ccc(Cc3ccc(OCC4CO4)cc3)cc2)c1)CC(O)COc1ccc(Cc2ccc(OCC3CO3)cc2)cc1]

The epoxy-functional adduct (E2) may further comprise an accelerator, such as a latent accelerator. Useful curing agents and/or accelerators include any of those described below. The curing agent and/or accelerator may be mixed with the epoxy-containing component (E1) or may be mixed with the diamine and/or the polyamine (A1).

The epoxy-containing compound (E1) or the epoxide-functional adduct (E2) of the composition may further include elastomeric particles. As used herein, “elastomeric particles” refers to particles comprised of one or more materials having at least one glass transition temperature (Tg) of greater than −150° C. and less than 30° C., calculated, for example, as described above. The elastomeric particles may be phase-separated from the epoxy in the epoxy-containing compound (E1) and/or the epoxide-functional adduct (E2). As used herein, the term “phase-separated” means forming a discrete domain within a matrix of the epoxy-containing compound (E1) and/or the epoxide-functional adduct (E2).

The elastomeric particles may have a core/shell structure. Suitable core-shell elastomeric particles may be comprised of an acrylic shell and an elastomeric core. The core may comprise natural or synthetic rubbers, polybutadiene, styrene-butadiene, polyisoprene, chloroprene, acrylonitrile butadiene, butyl rubber, polysiloxane, polysulfide, ethylene-vinyl acetate, fluoroelastomer, polyolefin, hydrogenated styrene-butadiene, or combinations thereof. In examples, no more than 50% by weight of the elastomeric particles comprise a polybutadiene core and/or a polysiloxane core based on total weight of the elastomeric particles.

The elastomeric particles may optionally be included in an epoxy carrier resin for introduction into the coating composition. Suitable finely dispersed core-shell elastomeric particles in an average particle size ranging from 20 nm to 400 nm may be master-batched in epoxy resin such as aromatic epoxides, phenolic novolac epoxy resin, bisphenol A and/or bisphenol F diepoxide, and/or aliphatic epoxides, which include cyclo-aliphatic epoxides, at concentrations ranging from 1% to 80% core-shell elastomeric particles by weight based on the total weight of the elastomeric dispersion, such as from 5% to 50%, such as from 15% to 35%. Suitable epoxy resins may also include a mixture of epoxy resins. When utilized, the epoxy carrier resin may be an epoxy-containing component such that the weight of the epoxy-containing component present in the coating composition includes the weight of the epoxy carrier resin.

Exemplary non-limiting commercial core-shell elastomeric particle products using poly(butadiene) rubber particles that may be utilized in the adducts and/or coating compositions of the present invention include core-shell poly(butadiene) rubber powder (commercially available as PARALOID™ EXL 2650A from Dow Chemical), a core-shell poly(butadiene) rubber dispersion (25% core-shell rubber by weight) in bisphenol F diglycidyl ether (commercially available as Kane Ace MX 136), a core-shell poly(butadiene) rubber dispersion (33% core-shell rubber by weight) in Epon® 828 (commercially available as Kane Ace MX 153), a core-shell poly(butadiene) rubber dispersion (33% core-shell rubber by weight) in Epiclon® EXA-835LV (commercially available as Kane Ace MX 139), a core-shell poly(butadiene) rubber dispersion (37% core-shell rubber by weight) in bisphenol A diglycidyl ether (commercially available as Kane Ace MX 257), and a core-shell poly(butadiene) rubber dispersion (37% core-shell rubber by weight) in Epon® 863 (commercially available as Kane Ace MX 267), each available from Kaneka Texas Corporation, and acrylic rubber dispersions.

Exemplary non-limiting commercial core-shell elastomeric particle products using styrene-butadiene rubber particles that may be utilized in the adducts and/or coating compositions include a core-shell styrene-butadiene rubber powder (commercially available as CLEARSTRENGTH® XT100 from Arkema), core-shell styrene-butadiene rubber powder (commercially available as PARALOID™ EXL 2650J), a core-shell styrene-butadiene rubber dispersion (33% core-shell rubber by weight) in bisphenol A diglycidyl ether (commercially available as Fortegra™ 352 from Olin™), core-shell styrene-butadiene rubber dispersion (33% rubber by weight) in low viscosity bisphenol A diglycidyl ether (commercially available as Kane Ace MX 113), a core-shell styrene-butadiene rubber dispersion (25% core-shell rubber by weight) in bisphenol A diglycidyl ether (commercially available as Kane Ace MX 125), a core-shell styrene-butadiene rubber dispersion (25% core-shell rubber by weight) in bisphenol F diglycidyl ether (commercially available as Kane Ace MX 135), a core-shell styrene-butadiene rubber dispersion (25% core-shell rubber by weight) in D.E.N.™-438 phenolic novolac epoxy (commercially available as Kane Ace MX 215), a core-shell styrene-butadiene rubber dispersion (25% core-shell rubber by weight) in Araldite® MY-721 multi-functional epoxy (commercially available as Kane Ace MX 416), a core-shell styrene-butadiene rubber dispersion (25% core-shell rubber by weight) in MY-0510 multi-functional epoxy (commercially available as Kane Ace MX 451), a core-shell styrene-butadiene rubber dispersion (25% core-shell rubber by weight) in Syna Epoxy 21 Cyclo-aliphatic Epoxy from Synasia (commercially available as Kane Ace MX 551), and a core-shell styrene-butadiene rubber dispersion (25% core-shell rubber by weight) in polypropylene glycol (MW 400) (commercially available as Kane Ace MX 715), each available from Kaneka Texas Corporation.

Exemplary non-limiting commercial core-shell elastomeric particle products using polysiloxane rubber particles that may be utilized in the adducts and/or coating compositions include a core-shell polysiloxane rubber powder (commercially available as GENIOPERL® P52 from Wacker), a core-shell polysiloxane rubber dispersion (40% core-shell rubber by weight) in bisphenol A diglycidyl ether (commercially available as ALBIDUIR® EP2240A from Evonik), a core-shell polysiloxane rubber dispersion (25% core-shell rubber by weight) in jER™828 (commercially available as Kane Ace MX 960), a core-shell polysiloxane rubber dispersion (25% core-shell rubber by weight) in Epon® 863 (commercially available as Kane Ace MX 965) each available from Kaneka Texas Corporation.

The average particle size of the elastomeric particles may be at least 20 nm, as measured by transmission electron microscopy (TEM), such as at least 30 nm, such as at least 40 nm, such as at least 50 nm, and may be no more than 400 nm, such as no more than 300 nm, such as no more than 200 nm, such as no more than 150 nm. The average particle size of the elastomeric particles may be 20 nm to 400 nm as measured by TEM, such as 30 nm to 300 nm, such as 40 nm to 200 nm, such as 50 nm to 150 nm. Suitable methods of measuring particle sizes by TEM include suspending elastomeric particles in a solvent selected such that the particles do not swell, and then drop casting the suspension onto a TEM grid which is allowed to dry under ambient conditions. For example, epoxy resin containing core-shell rubber elastomeric particles from Kaneka Texas Corporation can be diluted in butyl acetate for drop casting. Particle size measurements may be obtained from images acquired using a Tecnai T20 TEM operating at 200 kV and analyzed using ImageJ software, or an equivalent instrument and software.

The composition may further comprise a second component comprising a curing agent (A1) or (A2), described in more detail below, that chemically reacts with the epoxy-containing compound (E1) and/or the epoxide-functional adduct (E2) of the first component.

The curing agent of the second component may comprise a diamine comprising a cyclic ring and/or a polyamine comprising a cyclic ring (A1) and includes ortho-, meta-, and para-isomers of aromatic diamines and polyamines or any mixtures of these isomers. The diamine comprising a cyclic ring and/or polyamine comprising a cyclic ring (A1) also includes amines containing non-aromatic ring structures, such as aliphatic rings or heterocyclic rings. The diamine and/or the polyamine curing agent may be used to at least partially cure the composition by reacting with the epoxy-containing compound of the first component to form a polymeric matrix upon combining the first and second components of the composition.

In examples, the diamine and/or the polyamine may contain a cyclic ring. The cyclic ring may be intermolecular or may be pendant. For example, the diamine and/or the polyamine may comprise an aromatic ring such as xylylene diamine, phenylene diamine, methylenedianiline, diaminotoluene, diaminophenol, diamino diphenyl sulfone, 4,4'-oxydianiline, diethyl toluene diamine, methyl-bis(methylthio)benzenediamine (Ethacure 300, for example, available from Albemarle), aminobenzylamine, 5,5'-methylenedifurfurylamine, 5,5'-ethylidenedifurfurylamine, or combinations thereof. The diamine and/or polyamine may also comprise a non-aromatic cyclic ring such as isophorone diamine, 4,4-diaminodicyclohexylmethane, diaminocyclohexane, bis(aminomethyl)norbornane, bis(aminomethyl)cyclohexane, piperazine, aminoethylpiperazine, bis(aminopropyl)piperazine, or combinations thereof.

In other examples, the second component may further comprise a curing agent comprising an oligomeric cyclic ring-containing diamine or polyamine in addition to the diamine and/or the polyamine (A1) described above. As used herein, the term "oligomer" refers to a molecular complex of monomers having a finite number of repeating units. Optionally, the amino-functional oligomer may comprise an aromatic ring. In an example, the amine-functional oligomer may comprise an oligomeric amine reaction product of a reaction mixture comprising xylylene diamine and epichlorohydrin, which is commercially available as Gaskamine 328 (Mitsubishi Gas). In an example, the amine-functional oligomer may have one of the following structures:

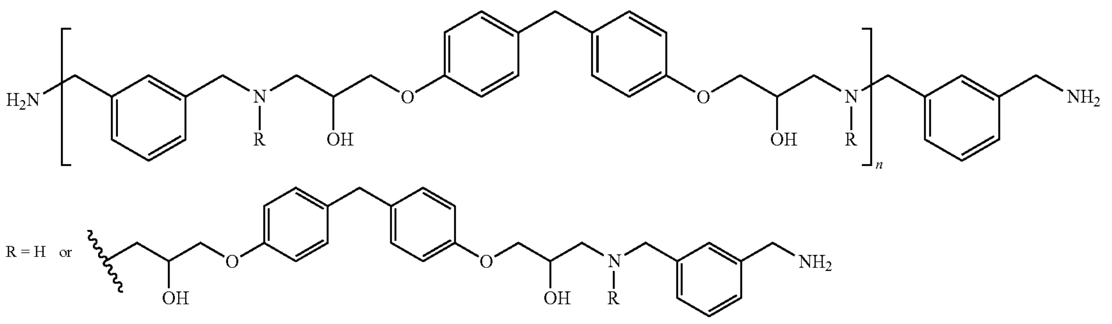

where n is at least 1, and the presence of R substituents on the amine demonstrate the possibility of branched structures (Structures II and III, respectively). In other examples, the curing agent of the second component may comprise a cyclic ring containing diamine partially reacted with a monofunctional epoxide. In an example, the curing agent of the second component may comprise the reaction product of excess xylylene diamine and glycidol, having the following structure:

(Structure III)

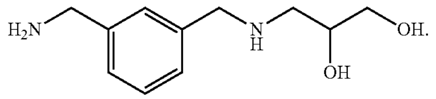

Optionally, in addition to the diamine or polyamine containing a cyclic ring, the second component may additionally comprise a monoamine, diamine, or polyamine. Useful monoamines include, but are not limited to, aniline, ethanolamine, N-methylethanolamine, butylamine, benzylamine, allylamine, ethylhexylamine, polypropylene glycol monoamines such as Jeffamine-M600 and Jeffamine M-2005 available from Huntsman, polyethylene glycol monoamines such as Jeffamine M-1000 and Jeffamine M-2070 available from Huntsman. Useful diamines include, but are not limited to, ethylenediamine, tetramethylenediamine, hexamethylenediamine, 2-methylpentamethylenediamine (available as Dytek A from Invista), polyether diamines such as those of the Jeffamine D, ED, or EDR series available from Huntsman. Useful polyamines include but are not limited to diethylenetriamine, triethylenetetramine, tetraethylenepentamine, tris(2-aminoethyl)amine, tris(3-aminopropyl)amine, and trifunctional polyether amines such as the Jeffamine T-403, Jeffamine T-3000, and Jeffamine T-5000 available from Huntsman.

Optionally, the curing agent of the second component may comprise a diamine comprising a cyclic ring and/or a polyamine comprising a cyclic ring in an amount of at least 20 percent by weight based on total weight of the diamine and/or polyamine present in the second component, such as at least 30 percent by weight, such as at least 40 percent by weight, such as at least 50 percent by weight, and may comprise a diamine comprising a cyclic ring and/or a polyamine comprising a cyclic ring in an amount of 100 percent by weight based on total weight of the diamine and/or polyamine in the second component, such as no more than 90 percent by weight, such as no more than 80 percent by weight, such as no more than 70 percent by weight, such as no more than 60 percent by weight. The curing agent of the second component may comprise a diamine comprising a cyclic ring and/or a polyamine comprising a cyclic ring in an amount of 20 percent by weight to 100 percent by weight based on total weight of the diamine and/or polyamine in the second component, such as 30 percent by weight to 90 percent by weight, such as 40 percent by weight to 80 percent by weight, such as 50 percent by weight to 70 percent by weight. In an example, the cyclic ring may comprise a benzene. In an example, the diamine comprising a cyclic ring may comprise xylylene diamine.

The diamine and/or polyamine (A1) curing agent may be present in the composition in an amount sufficient to provide a molar ratio of epoxide functional groups from the epoxy-containing compound to amine-hydrogens from the diamine and/or polyamine curing agent of at least 0.5:1.0, such as at least 0.75:1.0, and may be present in the composition in amount to provide a molar ratio of epoxide functional groups from the epoxy-containing compound to amine-hydrogens from the diamine and/or polyamine curing agent of no more than 1.5:1.0, such as no more than 1.25 to 1.0. The diamine and/or polyamine curing agent may be present in the composition in an amount sufficient to provide a molar ratio of epoxide functional groups from the epoxy-containing compound to amine-hydrogens from the diamine and/or polyamine curing agent of 0.5:1.0 to 1.5:1.0, such as 0.75:1.0 to 1.25 to 1.0.

Alternatively, the second component of the composition may comprise an amine-functional adduct (A3).

The monoamine, diamine, or polyamine (A2) used to synthesize the amine-functional adduct (A3) may comprise an aliphatic amine, an araliphatic amine, and/or a cycloaliphatic amine. Useful monoamines include, but are not limited to, aniline, ethanolamine, N-methylethanolamine, butylamine, benzylamine, allylamine, ethylhexylamine, polypropylene glycol monoamines such as Jeffamine-M600 and Jeffamine M-2005 available from Huntsman, polyethylene glycol monoamines such as Jeffamine M-1000 and Jeffamine M-2070 available from Huntsman. Useful diamines include, but are not limited to, ethylenediamine, tetramethylenediamine, hexamethylenediamine, 2-methylpentamethylenediamine (available as Dytek A from Invista), isophorone diamine, 4,4-diaminodicyclohexylmethane, diaminocyclohexane, bis(aminomethyl)norbornane, bis(aminomethyl)cyclohexane, piperazine, aminoethylpiperazine, polyether diamines such as those of the Jeffamine D, ED, or EDR series available from Huntsman. Useful polyamines include but are not limited to diethylenetriamine, triethylenetetramine, tetraethylenepentamine, tris(2-aminoethyl)amine, tris(3-aminopropyl)amine, and trifunctional polyether amines such as the Jeffamine T-403, Jeffamine T-3000, and Jeffamine T-5000 available from Huntsman.

The monoamine, diamine and/or polyamine (A2) may be used in the reaction mixture generating the amine-functional adduct (A3) in an amount sufficient to provide a molar ratio of epoxide functional groups from the epoxide-functional adduct (E2) to amine-hydrogens from monoamine, diamine, and/or polyamine (A2) of at least 1:2, such as at least 1:3, such as at least 1:4, such as at least 1:5, such as at least 1:6, such as at least 1:7, such as at least 1:8, such as at least 1:9, such as at least 1:10.

The amine-functional adduct (A3) may further comprise an accelerator. Useful accelerators include any of those described below. The accelerator may be mixed with the epoxide-functional adduct (E2) or may be mixed with the monoamine, diamine and/or polyamine (A2).

The second component of the composition may further comprise elastomeric particles. For example, the diamine comprising a cyclic ring and/or the polyamine comprising a cyclic ring (A1) and the amine-functional adduct (A3) each may further comprise elastomeric particles. Useful elastomeric particles include those described above, including elastomeric particles having a core-shell structure. For example, the elastomeric particles may optionally be introduced into the second component of the coating composition as solid particles, such as core-shell elastomeric particles having an average particle size of 20 nm to 400 nm.

Elastomeric particles, if present at all, and whether present in the first component and/or the second component, may be present in the composition in a total amount of at least 1 percent by weight based on total weight of the composition, such as at least 3 percent by weight, such as at least 5 percent by weight, and may be present in the composition in a total amount of no more than 50 percent by weight based on total weight of the composition, such as no more than 40 percent by weight, such as no more than 25 percent by weight. Elastomeric particles, if present at all, and whether present in the first component and/or the second component, may be present in the composition in a total amount of 1 percent by weight to 50 percent by weight based on total weight of the composition, such as 3 percent by weight to 40 percent by weight, such as 5 percent by weight to 25 percent by weight.

Optionally, the first component and/or the second component of the composition may further comprise an accelerator. Likewise, any of the components used to form the epoxide-functional adduct (E2) or the amine-functional adduct (E3) may further comprise an accelerator.

In examples, the accelerator may comprise, or consist essentially of, or consist of, a guanidine. It will be understood that "guanidine," as used herein, refers to guanidine and derivatives thereof. For example, the curing agent that may be used includes guanidines, substituted guanidines, substituted ureas, melamine resins, guanamine derivatives, and/or mixtures thereof. Examples of substituted guanidines are methylguanidine, dimethylguanidine, trimethylguanidine, tetramethylguanidine, methylisobiguanidine, dimethylisobiguanidine, tetramethylisobiguanidine, hexamethylisobiguanidine, heptamethylisobiguanidine and, more especially, cyanoguanidine (dicyandiamide, e.g. Dyhard® available from AlzChem). Representatives of suitable guanamine derivatives which may be mentioned are alkylated benzoguanamine resins, benzoguanamine resins or methoxymethylethoxymethylbenzoguanamine.

For example, the guanidine may comprise a compound, moiety, and/or residue having the following general structure:

(IV)

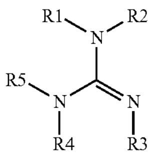

wherein each of R1, R2, R3, R4, and R5 (i.e., substituents of structure (IV)) comprise hydrogen, (cyclo)alkyl, aryl, aromatic, organometallic, a polymeric structure, or together can form a cycloalkyl, aryl, or an aromatic structure, and wherein R1, R2, R3, R4, and R5 may be the same or different. As used herein, "(cyclo)alkyl" refers to both alkyl and cycloalkyl. When any of the R groups "together can form a (cyclo)alkyl, aryl, and/or aromatic group", it is meant that any two adjacent R groups are connected to form a cyclic moiety, such as the rings in structures (V)-(VIII) below.

It will be appreciated that the double bond between the carbon atom and the nitrogen atom that is depicted in structure (IV) may be located between the carbon atom and another nitrogen atom of structure (IV). Accordingly, the various substituents of structure (IV) may be attached to different nitrogen atoms depending on where the double bond is located within the structure.

The guanidine may comprise a cyclic guanidine such as a guanidine of structure (IV) wherein two or more R groups of structure (IV) together form one or more rings. In other words, the cyclic guanidine may comprise ≥1 ring(s). For example, the cyclic guanidine may either be a monocyclic guanidine (1 ring) such as depicted in structures (V) and (VI) below, or the cyclic guanidine may be bicyclic or polycyclic guanidine (≥2 rings) such as depicted in structures (VII) and (VIII) below.

(V)

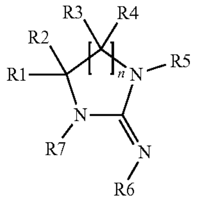

(VI)

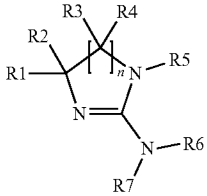

(VII)

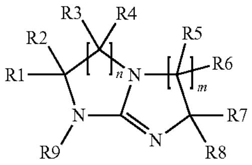

(VIII)

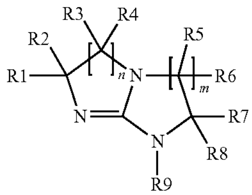

Each substituent of structures (V) and/or (VI), R1-R7, may comprise hydrogen, (cyclo)alkyl, aryl, aromatic, organometallic, a polymeric structure, or together can form a cycloalkyl, aryl, or an aromatic structure, and wherein R1-R7 may be the same or different. Similarly, each substituent of structures (VII) and (VIII), R1-R9, may be hydrogen, alkyl, aryl, aromatic, organometallic, a polymeric structure, or together can form a cycloalkyl, aryl, or an aromatic structure, and wherein R1-R9 may be the same or different. Moreover, in some examples of structures (V) and/or (VI), certain combinations of R1-R7 may be part of the same ring structure. For example, R1 and R7 of structure (V) may form part of a single ring structure. Moreover, it will be understood that any combination of substituents (R1-R7 of structures (V) and/or (VI) as well as R1-R9 of structures (VII) and/or (VIII)) may be chosen so long as the substituents do not substantially interfere with the catalytic activity of the cyclic guanidine.

Each ring in the cyclic guanidine may be comprised of ≥5 members. For example, the cyclic guanidine may comprise a 5-member ring, a 6-member ring, and/or a 7-member ring. As used herein, the term "member" refers to an atom located in a ring structure. Accordingly, a 5-member ring will have 5 atoms in the ring structure ("n" and/or "m"=1 in structures (V)-(VIII)), a 6-member ring will have 6 atoms in the ring structure ("n" and/or "m"=2 in structures (V)-(VIII)), and a 7-member ring will have 7 atoms in the ring structure ("n" and/or "m"=3 in structures (V)-(VIII)). It will be appreciated that if the cyclic guanidine is comprised of ≥2 rings (e.g., structures (VII) and (VIII)), the number of members in each ring of the cyclic guanidine can either be the same or different. For example, one ring may be a 5-member ring while the other ring may be a 6-member ring. If the cyclic guanidine is comprised of ≥3 rings, then in addition to the combinations cited in the preceding sentence, the number of members in a first ring of the cyclic guanidine may be different from the number of members in any other ring of the cyclic guanidine.

It will also be understood that the nitrogen atoms of structures (V)-(VIII) may further have additional atoms attached thereto. Moreover, the cyclic guanidine may either be substituted or unsubstituted. For example, as used herein in conjunction with the cyclic guanidine, the term "substituted" refers to a cyclic guanidine wherein R5, R6, and/or R7 of structures (V) and/or (VI) and/or R9 of structures (VII) and/or (VIII) is not hydrogen. As used herein in conjunction with the cyclic guanidine, the term "unsubstituted" refers to a cyclic guanidine wherein R1-R7 of structures (V) and/or (VI) and/or R1-R9 of structures (VII) and/or (VIII) are hydrogen.

The cyclic guanidine may comprise a bicyclic guanidine, and the bicyclic guanidine may comprise 1,5,7-triazabicyclo [4.4.0]dec-5-ene ("TBD" or "BCG") or 7-methyl-1,5,7-triazabicyclo[4.4.0]dec-5-ene (MTBD).

Other useful accelerators may comprise amidoamine or polyamide accelerators, such as, for example, one of the Ancamide® products available from Air Products, amine, amino-containing phenols, dihydrazide, imidazole, or dicyandiamide adducts and complexes, such as, for example, one of the Ajicure® products available from Ajinomoto Fine Techno Company, 3,4-dichlorophenyl-N,N-dimethylurea (A.K.A. Diuron) available from Alz Chem, or combinations thereof.

Useful accelerators that may be included in the second component of the composition may comprise secondary amines, tertiary amines, cyclic tertiary amines, amidines, or combinations thereof. The cyclic tertiary amine may comprise 1,4-diazabicyclo[2.2.2]octane ("DABCO"), 1,8-diazabicylo[5.4.0]undec-7-ene ("DBU"), 1,5-diazabicyclo [4.3.0]non-5-ene ("DBN"), and combinations thereof. Additional examples of suitable accelerators include, pyridine, imidazole, dimethylaminopyridine, 1-methylimidazole, N,N'-carbonyldiimidazole, [2,2]bipyridine, 2,4,6-tris (dimethylamino methyl)phenol, 3,5-dimethylpyrazole, and combinations thereof. Additional examples of useful accelerators include Mannich bases, tetraalkyl ammonium salts, metal salts, and strong bases.

The accelerator, if present at all, may be present in the second component of the composition in an amount of at least 0.5 percent by weight based on total weight of the composition, such as at least 1 percent by weight, and may be present in an amount of no more than 55 percent by weight based on total weight of the composition, such as no more than 20 percent by weight. The accelerator, if present at all, may be present in the second component of the composition in an amount of 0.5 percent by weight to 55 percent by weight based on total weight of the composition, such as 1 percent by weight to 20 percent by weight.

A filler material or more than one filler material may optionally be added to the first and/or second component of the composition, the epoxide-functional adduct (E2), and/or the amine-functional adduct (A3) described above. Useful fillers that may be introduced to provide improved mechanical properties include materials such as fiberglass, fibrous titanium dioxide, whisker type calcium carbonate (aragonite), and carbon fiber (which includes graphite and carbon nanotubes). In addition, fiber glass ground to 5 microns or wider and to 50 microns or longer may also provide additional tensile strength. Additionally, filler material may optionally be graphene and graphenic carbon particles (for example, xGnP graphene nanoplatelets commercially available from XG Sciences), and/or for example, carbon particles having structures comprising one or more layers of one-atom-thick planar sheets of sp2-bonded carbon atoms that are densely packed in a honeycomb crystal lattice. The average number of stacked layers may be less than 100, for example, less than 50. The average number of stacked layers may be 30 or less, such as 20 or less, such as 10 or less, such as 5 or less. The graphenic carbon particles may be substantially flat; however, at least a portion of the planar sheets may be substantially curved, curled, creased, or buckled. The particles typically do not have a spheroidal or equiaxed morphology. Suitable graphenic carbon particles are described in U.S. Publication No. 2012/0129980, at paragraphs [0059]-[0065], the cited portion of which is incorporated herein by reference. Other suitable graphenic carbon particles are described in U.S. Pat. No. 9,562,175, at 6:6 to 9:52, the cited portion of which are incorporated herein by reference.

Organic and/or inorganic fillers, such as those that are substantially spherical, may optionally be added to the first and/or second component of the composition, the epoxide-functional adduct (E2), and/or the amine-functional adduct (A3) described above. Useful organic fillers that may be introduced include cellulose, starch, and acrylic. Useful inorganic fillers that may be introduced include borosilicate, aluminosilicate, calcium inosilicate (Wollastonite), mica, silica and calcium carbonate. The organic and inorganic fillers may be solid, hollow, or layered in composition and may range in size from 10 nm to 1 mm in at least one dimension, measured, for example by TEM or SEM.

Optionally, additional fillers, thixotropes, colorants, tints and/or other materials also may be added to the first and/or second component of the composition, the epoxide-functional adduct (E2), and/or the amine-functional adduct (A3) described above.

Useful thixotropes that may be used include untreated fumed silica and treated fumed silica, castor wax, clay, organo clay and combinations thereof. In addition, fibers such as synthetic fibers like Aramid® fiber and Kevlar® fiber, acrylic fibers, and/or engineered cellulose fiber may also be utilized.

Useful colorants, dyes, or tints may include red iron pigment, titanium dioxide, calcium carbonate, and phthalocyanine blue and combinations thereof.

Useful fillers that may be used in conjunction with thixotropes may include inorganic fillers such as inorganic clay or silica and combinations thereof.

Exemplary other materials that may be utilized include, for example, calcium oxide and carbon black and combinations thereof.

Such fillers, if present at all, may be present in the first and/or second component of the composition, such as no more than 15 percent by weight based on total weight of the composition, such as no more than 10 percent by weight, such as no more than 5 percent by weight. Such fillers may be present in the first and/or second component of the composition in an amount of 0 percent to 25 percent by weight based on total weight of the composition, such as 0.1 percent by weight to 15 percent by weight, such as 0.5 percent by weight to 10 percent by weight, such as 1 percent by weight to 5 percent by weight.

Optionally, the composition or the adducts (E2) and (A3) described above may be substantially free, or essentially free, or completely free, of platy fillers such as talc, pyrophyllite, chlorite, vermiculite, or combinations thereof. Optionally, the composition may be substantially free, or essentially free, or completely free, of alumina fillers, including plate-like alumina particles, spherical alumina particles, and/or amorphous alumina particles.

The composition or the epoxide-functional adduct (E2) or the amine-functional adduct (A3) described above may further comprise an additive or more than one additive. As used herein, the term "additives" refers to ingredients or components included in the coating composition in addition to the epoxy-containing compound, the polyamine curing agent, the elastomeric particles, the second curing agent (if any), the accelerator (if any), and the fillers (if any) described herein. Exemplary non-limiting examples of such additives include flexibilizers such as Flexibilzer® DY 965 from Huntsman Corporation, reactive liquid rubber, non-reactive liquid rubber, epoxy-amine adducts (such as those described above but, when present, different from the epoxy-containing compound present in the coating composition), epoxy-thiol adducts, blocked isocyanates, capped isocyanates, epoxy-urethanes, epoxy-ureas, modified epoxies from Hexion, HELOXY™ modifiers from Hexion, adhesion promoters, silane coupling agents such as Silquest A-187 from Momentive, flame retardants, rust inhibitors, solvents, colloidal silica such as NANOPDX® dispersions from Evonik, thermoplastic resins, acrylic polymer beads such as ZEFIAC® beads from AICA Kogyo Co, cyclic carbonate-functional molecules, or combinations thereof.

Such additives, if present at all, may be present in the composition in an amount of at least 1 percent by weight based on total weight of the composition, such as at least 2 percent by weight, and may be present in the composition in an amount of no more than 25 percent by weight based on total weight of the composition, such as no more than 10 percent by weight. Such additives, if present at all, may be present in the composition in an amount of 1 percent by weight to 25 percent by weight based on total weight of the composition, such as 2 percent by weight to 10 percent by weight.

Methods

Disclosed herein are methods for treating a variety of substrates. The method may comprise, or consist essentially of, or consist of: contacting a surface of the substrate with a deoxidizing composition; and contacting the substrate surface with a coating composition. Optionally, the substrate surface may be cleaned. The deoxidizing composition may comprise, or consist essentially of, or consist of, a homopolymer or copolymer comprising, or consisting essentially of, or consisting of, a phosphorous-containing monomeric subunit m1 as described above. The deoxidizing composition may comprise, or consist essentially of, or consist of, a Group IVA metal and/or a Group IVB metal and free fluoride, wherein the deoxidizing composition has a pH of 1.0 to 3.0. The coating composition may be any of the coating compositions described above, such as a two-component coating composition. Any suitable technique may be used to deposit such a coating composition onto the substrate, including, for example, brushing, dipping, flow coating, spraying and the like.

Following the cleaning step(s), the substrate optionally may be rinsed with tap water, deionized water, and/or an aqueous solution of rinsing agents in order to remove any residue. The wet substrate surface may be treated with a deoxidizing composition (described above) and/or with one of the coating compositions described below, or the substrate may be dried prior to treating the substrate surface, such as air dried, for example, by using an air knife, by flashing off the water by brief exposure of the substrate to, for example, 15° C. to 100° C., such as 20° C. to 90° C., or in a heater assembly using, for example, infrared heat, such as for 10 minutes at 70° C., or by passing the substrate between squeegee rolls.

According to the methods of the present invention, the solution or dispersion of the deoxidizing composition may be brought into contact with the substrate by any of a variety of known techniques, such as dipping or immersion, spraying, intermittent spraying, dipping followed by spraying, spraying followed by dipping, brushing, or roll-coating. The deoxidizing composition, when applied to the metal substrate, may be at a temperature ranging from 4° C. to 85° C., such as 15.5° C. to 43.3° C., such as 21° C. to 32.2° C. For example, the deoxidation process may be carried out at ambient or room temperature. The contact time may be 5 seconds to 15 minutes, such as 10 seconds to 10 minutes, such as 15 seconds to 3 minutes.

Following the contacting with a deoxidizing composition disclosed herein, the substrate optionally may be air dried at room temperature or may be dried with hot air, for example, by using an air knife, by flashing off the water by brief exposure of the substrate to a high temperature, such as by drying the substrate in an oven at 15° C. to 200° C. or in a heater assembly using, for example, infrared heat, such as for 10 minutes at 70° C., or by passing the substrate between squeegee rolls. Following the contacting with a deoxidizing composition, the substrate optionally may be rinsed with tap water, deionized water, and/or an aqueous solution of rinsing agents in order to remove any residue and then optionally may be dried, for example air dried or dried with hot air as described in the preceding sentence, such as by drying the substrate in an oven at 15° C. to 100° C., such as 20° C. to 90° C., or in a heater assembly using, for example, infrared heat, such as for 10 minutes at 70° C., or by passing the substrate between squeegee rolls. Following the contacting with a deoxidizing composition, and any optional rinsing stages, a coating composition described herein may be deposited onto at least a portion of the surface of the substrate by any suitable technique, including, for example, brushing, dipping, flow coating, spraying and the like.

In an example, a bond may be formed between two substrates for a wide variety of potential applications in which the bond between the substrates provides particular mechanical properties related to both lap shear strength and displacement. A method of forming a bond may comprise, or consist essentially of, or consist of, contacting at least a portion of a surface of the substrate with a cleaning composition described herein, a deoxidizing composition described herein and/or a seal composition described herein, and contacting at least a portion of the substrate surface with a coating composition described above to a first substrate; contacting a second substrate to the coating composition such that the composition is located between the first substrate and the second substrate; and curing the composition, as described herein. For example, the composition may be applied to either one or both of the substrate materials being bonded to form an adhesive bond therebetween and the substrates may be aligned and pressure and/or spacers may be added to control bond thickness. The composition may be applied to cleaned or uncleaned (i.e., including oily or oiled) substrate surfaces.

The systems of the present invention may be applied to substrate surfaces, including, by way of non-limiting example, a vehicle body or components of an automobile frame or an airplane, or to armor assemblies such as those on a tank, or to protective clothing such as body armor, personal armor, suits of armor, and the like. The coating formed by the coating composition of the present invention provides sufficient lap shear strength and displacement and such lap shear strength and displacement are surprisingly increased when the substrate is treated with one of the deoxidizing compositions described hereinabove. The composition may be applied to cleaned (such as with one of the cleaning compositions described above) or uncleaned (i.e., including oily or oiled) substrate surfaces. It may also be applied to a substrate that has been pretreated, coated with an electrodepositable coating, coated with additional layers such as a primer, basecoat, or topcoat. The substrate may be treated with one of the deoxidizing compositions described above. An external energy source may subsequently be applied to cure the coating composition, such as baking in an oven.

As described above, substrates treated according to the systems and methods of the present invention may have a film, coating, or the like formed by the coating composition, applied to at least a portion of the substrate surface. In examples, the coating composition may have a dry film thickness of at least 12.5 micrometers (0.5 mil), such as at least 25 micrometers (1 mil), such as at least 75 micrometers (3 mil), and in some instances may have a dry film thickness of no more than 1270 micrometers (50 mil), such as no more than 635 micrometers (25 mil), such as no more than 405 micrometers (16 mil). In examples, the coating composition may have a dry film thickness of 12.5 micrometers to 1270 micrometers, such as 25 micrometers to 635 micrometers, such as 75 micrometers to 405 micrometers.

Substrates

The substrates that may be coated by the compositions disclosed herein are not limited. Suitable substrates useful in the present invention include, but are not limited to, materials such as metals or metal alloys, ceramic materials such as boron carbide or silicon carbide, polymeric materials such as hard plastics including filled and unfilled thermoplastic materials or thermoset materials, woven or non-woven fibrous sheets or grids, or composite materials. Other suitable substrates useful in the present invention include, but are not limited to, glass or natural materials such as wood. For example, suitable substrates include rigid metal substrates such as ferrous metals, aluminum, aluminum alloys, magnesium titanium, copper, and other metal and alloy substrates. The ferrous metal substrates used in the practice of the present invention may include iron, steel, and alloys thereof. Non-limiting examples of useful steel materials include cold rolled steel, galvanized (zinc coated) steel, electrogalvanized steel, stainless steel, pickled steel, zinc-iron alloy such as GALVANNEAL, and combinations thereof. Combinations or composites of ferrous and non-ferrous metals can also be used. Aluminum alloys of the 1XXX, 2XXX, 3XXX, 4XXX, 5XXX, 6XXX, 7XXX, or 8XXX series as well as clad aluminum alloys and cast aluminum alloys of the A356, 1XX.X, 2XX.X, 3XX.X, 4XX.X, 5XX.X, 6XX.X, 7XX.X, or 8XX.X series also may be used as the substrate. Magnesium alloys of the AZ31B, AZ91C, AM60B, or EV31A series also may be used as the substrate. The substrate used in the present invention may also comprise titanium and/or titanium alloys of grades 1-36 including H grade variants. Other suitable non-ferrous metals include copper and magnesium, as well as alloys of these materials. Suitable metal substrates for use in the present invention include those that are used in the assembly of vehicular bodies (e.g., without limitation, door, body panel, trunk deck lid, roof panel, hood, roof and/or stringers, rivets, landing gear components, and/or skins used on an aircraft), a vehicular frame, vehicular parts, motorcycles, wheels, and industrial structures and components. As used herein, "vehicle" or variations thereof includes, but is not limited to, civilian, commercial and military aircraft, and/or land vehicles such as cars, motorcycles, and/or trucks. The metal substrate also may be in the form of, for example, a sheet of metal or a fabricated part. The substrate may comprise a fibrous material, a sheet, or a mesh, including comprising carbon fibers, glass fibers, and/or nylon. The substrate may comprise a composite material such as a plastic or a fiberglass composite. The substrate may be a fiberglass and/or carbon fiber composite. The compositions disclosed herein are particularly suitable for use in various industrial or transportation applications including automotive, light and heavy commercial vehicles, marine, or aerospace.

In examples, it has been surprisingly and unexpectedly discovered that treatment of at least a portion of a substrate surface with a system or method of the present invention (i.e., one of the deoxidizing compositions of the present invention, followed by treatment with one of the coating compositions described herein) result in a substrate having formed thereon a coating, film, or the like that may have a lap shear displacement at failure of at least 2.5 mm, such as at least 3.0 mm, such as at least 3.1 mm, and a lap shear strength of at least 30 MPa, such as at least 32 MPa, such as at least 35 MPa, wherein lap shear displacement and lap shear strength each are measured according to ASTM D1002-10 using 2024-T3 aluminum substrate of 1.6 mm thickness, as measured by an INSTRON 5567 machine in tensile mode with a pull rate of 1.3 mm per minute. Treatment of at least a portion of a substrate surface with a system or method of the present invention (i.e., one of the deoxidizing compositions of the present invention, followed by treatment with one of the coating compositions described herein) may increase lap shear displacement at failure and lap shear strength above what may be achieved when the coating composition is applied to a substrate surface that has been treated with a conventional deoxidizing composition.

It also has been surprisingly and unexpectedly discovered that treatment of at least a portion of a surface of a metal substrate with one of systems of the present invention (i.e., one of the deoxidizing compositions of the present invention, followed by treatment with one of the coating compositions described herein) eliminates the need for treating the substrate surface with a pretreatment composition, such as zinc phosphate-, hexavalent chromium-, or Group IVB metal-containing pretreatment compositions.

Additive Manufacturing

The 2K compositions disclosed herein surprisingly may be used in any suitable additive manufacturing technology, such as extrusion, jetting, and binder jetting.

The present disclosure is directed to the production of structural articles, such as by way of non-limiting example, sound damping pads, using three-dimensional printing. A three-dimensional article may be produced by forming successive portions or layers of an article by depositing the composition of the present invention onto a substrate and thereafter depositing additional portions or layers of the composition over the underlying deposited portion or layer and/or adjacent the previously deposited portion or layer. Layers can be successively deposited adjacent to a previously deposited layer to build a printed article. First and second components of the composition can be mixed and then deposited or the first and second components of the composition can be deposited separately. When deposited separately, the first and second components can be deposited simultaneously, sequentially, or both simultaneously and sequentially.

By "portions of an article," when used with respect to additive manufacturing, is meant subunits of an article, such as layers of an article. The layers may be on successive horizontal parallel planes. The portions may be parallel planes of the deposited material or beads of the deposited material produced as discreet droplets or as a continuous stream of material. The first and second components may each be provided neat or may also include a solvent (organic and/or water) and/or other additives as described below. First and second components provided by the present disclosure may be substantially free of solvent. By substantially free is meant that the first and second components comprise less than 5 wt %, less than 4 wt %, less than 2 wt %, or less than 1 wt % of solvent, where wt % is based on the total weight of the first component or the second component, as the case may be. Similarly, the composition provided by the present disclosure may be substantially free of solvent, such as having less than 5 wt %, less than 4 wt %, less than 2 wt %, or less than 1 wt % of solvent, where wt % is based on the total weight of the composition.

The first and second components may be mixed together and subsequently deposited as a mixture of components that react to form portions of an article. For example, two components may be mixed together and deposited as a mixture of components that react to form a thermoset by delivery of at least two separate streams of the components into a mixer such as a static mixer and/or a dynamic mixer to produce a single stream that is then deposited. The components may be at least partially reacted by the time a composition comprising the reaction mixture is deposited. The deposited reaction mixture may react at least in part after deposition and may also react with previously deposited portions and/or subsequently deposited portions of the article such as underlying layers or overlying layers of the article.

Two or more components can be deposited using any suitable equipment. The selection of suitable deposition equipment depends on a number of factors including the deposition volume, the viscosity of the composition and the complexity of the part being fabricated. Each of the two or more components can be introduced into an independent pump and injected into a mixer to combine and mix the two components. A nozzle can be coupled to the mixer and the mixed composition can be pushed under pressure or extruded through the nozzle.

A pump can be, for example, a positive displacement pump, a syringe pump, a piston pump, or a progressive cavity pump. The two pumps delivering the two components can be placed in parallel or placed in series. A suitable pump can be capable of pushing a liquid or viscous liquid through a nozzle orifice. This process can also be referred to as extrusion. A component can be introduced into the mixer using two pumps in series.

For example, the first and second components can be deposited by dispensing materials through a disposable nozzle attached to a progressive cavity two-component dosing system such as a ViscoTec eco-DUO 450 precision dosing system, where the first and second components are mixed in-line. A two-component dosing system can comprise, for example, two progressive cavity pumps that separately dose reactants into a disposable static mixer dispenser or into a dynamic mixer. Other suitable pumps include positive displacement pumps, syringe pumps, piston pumps, and progressive cavity pumps. Upon dispensing, the materials of the first and second components form an extrudate which can be deposited onto a surface to provide an initial layer of material and successive layers on a base. The deposition system can be positioned orthogonal to the base, but also may be set at any suitable angle to form the extrudate such that the extrudate and deposition system form an obtuse angle with the extrudate being parallel to the base. The extrudate refers to the combined components, i.e., a composition, that have been mixed, for example, in a static mixer or in a dynamic mixer. The extrudate can be shaped upon passing through a nozzle.

The base, the deposition system, or both the base and the deposition system may be moved to build up a three-dimensional article. The motion can be made in a predetermined manner, which may be accomplished using any suitable CAD/CAM method and apparatus such as robotics and/or computerized machine tool interfaces.

An extrudate may be dispensed continuously or intermittently to form an initial layer and successive layers. For intermittent deposition, a dosing system may interface with a relay switch to shut off the pumps, such as the progressive cavity pumps and stop the flow of reactive materials. Any suitable switch such as an electromechanical switch that can be conveniently controlled by any suitable CAD/CAM methodology can be used.

A deposition system can include an in-line static and/or dynamic mixer as well as separate pressurized pumping compartments to hold the at least two components and feed the materials into the static and/or dynamic mixer. A mixer such as an active mixer can comprise a variable speed central impeller having high shear blades within a conical nozzle. A range of conical nozzles may be used which have an exit orifice dimension, for example, from 0.2 mm to 50 mm, from 0.5 mm to 40 mm, from 1 mm to 30 mm, or from 5 mm to 20 mm.

A range of static and/or dynamic mixing nozzles may be used which have, for example, an exit orifice dimension from 0.6 mm to 2.5 mm, and a length from 30 mm to 150 mm. For example, an exit orifice diameter can be from 0.2 mm to 4.0 mm, from 0.4 mm to 3.0 mm, from 0.6 mm to 2.5 mm, from 0.8 mm to 2 mm, or from 1.0 mm to 1.6 mm. A static mixer and/or dynamic can have a length, for example, from 10 mm to 200 mm, from 20 mm to 175 mm, from 30 mm to 150 mm, or from 50 mm to 100 mm. A mixing nozzle can include a static and/or dynamic mixing section and a dispensing section coupled to the static and/or dynamic mixing section. The static and/or dynamic mixing section can be configured to combine and mix the first and second components. The dispensing section can be, for example, a straight tube having any of the above orifice diameters. The length of the dispensing section can be configured to provide a region in which the components can begin to react and build viscosity before being deposited on the article. The length of the dispensing section can be selected, for example, based on the speed of deposition, the rate of reaction of the first and second components, and the desired viscosity.

First and second components can have a residence time in the static and/or dynamic mixing nozzle, for example, from 0.25 seconds to 5 seconds, from 0.3 seconds to 4 seconds, from 0.5 seconds to 3 seconds, or from 1 seconds to 3 seconds. Other residence times can be used as appropriate based on the curing chemistries and curing rates.

In general, a suitable residence time is less than the gel time of the composition. A suitable gel time can be less than 10 min, less than 8 min, less than 6 min, less than 5 min, less than 4 min, less than 3 min, less than 2 min, or less than 1 min. A gel time of the composition can be, for example, from 0.5 min to 10 min, from 1 min to 7 min, from 2 min to 6 min, or from 3 min to 5 min.

Compositions provided by the present disclosure can have a volume flow rate, for example, from 0.1 mL/min to 20,000 mL/min, such as from 1 mL/min to 12,000 mL/min, from 5 mL/min to 8,000 mL/min, or from 10 mL/min to 6,000 mL min. The volume flow rate can depend, for example, on the viscosity of the composition, the extrusion pressure, the nozzle diameter, and the reaction rate of the first and second components.

A composition can be used at a print speed, for example, from 1 mm/sec to 400 mm/sec, such as from 5 mm/sec to 300 mm/sec, from 10 mm/sec to 200 mm/sec, or from 15 mm/sec to 150 mm/sec. The printed speed can depend, for example, on the viscosity of the composition, the extrusion pressure, the nozzle diameter, and the reaction rate of the components. The print speed refers to the speed at which a nozzle used to extrude a composition move with respect to a surface onto which the composition is being deposited.

A composition can have a gel time, for example, less than 5 minutes, less than 4 minutes, less than 3 minutes, less than 2 minutes, less than 1 minute, less than 45 seconds, less than 30 seconds, less than 15 seconds, or less than 5 seconds. A composition can have a gel time, for example, from 0.1 seconds to 5 minutes, from 0.2 seconds to 3 minutes, from 0.5 seconds to 2 minutes, from 1 second to 1 minute, or from 2 seconds to 40 seconds. Gel time is considered as the time following mixing when the composition is no longer stirrable by hand.

A static and/or dynamic mixing nozzle can be heated or cooled to control, for example, the rate of reaction between the first and second components and/or the viscosity of the first and second components. An orifice of a deposition nozzle can have any suitable shape and dimensions. A system can comprise multiple deposition nozzles. The nozzles can have a fixed orifice dimension and shape, or the nozzle orifice can be controllably adjusted. The mixer and/or the nozzle may be cooled to control an exotherm generated by the reaction of the first and second components.

Methods provided by the present disclosure include printing the composition on a fabricated part. Methods provided by the present disclosure include directly printing parts.

Using the methods provided by the present disclosure parts can be fabricated. The entire part can be formed from one of the compositions disclosed herein, one or more portions of a part can be formed from one of the compositions disclosed herein, one or more different portions of a part can be formed using the compositions disclosed herein, and/or one or surfaces of a part can be formed from a composition provided by the present disclosure. In addition, internal regions of a part can be formed from a composition provided by the present disclosure.

In examples, any of the coating compositions described above may be extruded to form an article. Any of the deoxidizing compositions described herein may be applied to at least a portion of a surface of the extruded article.

Whereas specific aspects of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

ASPECTS OF THE INVENTION

In the following, some non-limiting aspects of the present invention are summarized:

Aspect 1. A system for treating a substrate, comprising:

a deoxidizing composition comprising a Group IVA metal and/or a Group IVB metal and free fluoride, wherein the deoxidizing composition has a pH of 1.0 to 3.0; and a coating composition comprising:

a first component comprising an epoxy-containing compound (E1); and a second component that chemically reacts with the epoxy-containing compound (E1), the second component comprising an amine-functional adduct (A3) comprising a second reaction product of a reaction mixture comprising an epoxide-functional adduct (E2) comprising a first reaction product of a reaction mixture comprising an epoxy-containing compound (E1) and a diamine comprising a cyclic ring and/or a polyamine comprising a cyclic ring (A1).

Aspect 2. A system for treating a substrate, comprising:

a deoxidizing composition comprising a Group IVA metal and/or a Group IVB metal and free fluoride, wherein the deoxidizing composition has a pH of 1.0 to 3.0; and a coating composition comprising:

a first component comprising the epoxide-functional adduct (E2) comprising a first reaction product of a reaction mixture comprising an epoxy-containing compound (E1) and a diamine comprising a cyclic ring and/or a polyamine comprising a cyclic ring (A1); and a second component that chemically reacts with the epoxide-functional adduct (E2), the second component comprising a monoamine, diamine, and/or polyamine (A2), wherein the diamine and/or polyamine (A2) is different than the diamine comprising a cyclic ring and/or a polyamine comprising a cyclic ring (A1).

Aspect 3. A system for treating a substrate, comprising:

a deoxidizing composition comprising a Group IVA metal and/or a Group IVB metal and free fluoride, wherein the deoxidizing composition has a pH of 1.0 to 3.0; and a coating composition comprising:

a first component comprising the epoxide-functional adduct (E2) comprising a first reaction product of a reaction mixture comprising an epoxy-containing compound (E1) and a diamine comprising a cyclic ring and/or a polyamine comprising a cyclic ring (A1); and the amine-functional adduct (A3) comprising a second reaction product of a reaction mixture comprising a second epoxide-functional adduct (E2) comprising a first reaction product of a reaction mixture comprising an epoxy-containing compound (E1) and a diamine comprising a cyclic ring and/or a polyamine comprising a cyclic ring (A1).

Aspect 4. The system of any of Aspects 1 to 3, wherein the Group IVA metal is present in the deoxidizing composition in an amount of 10 ppm to 1000 ppm based on total weight of the deoxidizing composition.

Aspect 5. The system of any of the preceding Aspects, wherein the Group IVB metal is present in the deoxidizing composition in an amount of 200 ppm to 5000 ppm based on total weight of the deoxidizing composition.

Aspect 6. The system of any of the preceding Aspects, wherein the free fluoride in the deoxidizing composition derives from a compound or complex comprising the Group IVA metal and/or the Group IVB metal.

Aspect 7. The system of any of the preceding Aspects, wherein the free fluoride in the deoxidizing composition derives from a compound or complex other than a compound or complex comprising the Group IVA metal and/or the Group IVB metal.

Aspect 8. The system of any of the preceding Aspects, wherein the free fluoride is present in the deoxidizing composition in an amount of 2 ppm to 100 ppm based on total weight of the deoxidizing composition.

Aspect 9. The system of any of the preceding Aspects, wherein the deoxidizing composition further comprises a Group IA metal, a Group VIB metal, an electropositive metal, or combinations thereof.

Aspect 10. The system of Aspect 9, wherein the Group IA metal is present in the deoxidizing composition in an amount of 2 ppm to 500 ppm based on total weight of the deoxidizing composition.

Aspect 11. The system of Aspect 9 or Aspect 10, wherein the Group VIB metal is present in the deoxidizing composition in an amount of 5 ppm to 500 ppm based on total weight of the deoxidizing composition.

Aspect 12. The system of any one of Aspects 9 to 11, wherein the electropositive metal is present in the deoxidizing composition in an amount of 2 ppm to 100 ppm based on total weight of the deoxidizing composition.

Aspect 13. The system of any one of the preceding Aspects, wherein the deoxidizing composition is substantially free of chromium, derivatives of chromium, phosphate ions, and/or inorganic phosphate-containing compounds.

Aspect 14. The system of any of the preceding Aspects, wherein the deoxidizing composition further comprises a homopolymer or copolymer comprising a phosphorous-containing monomeric subunit m1 and optionally a non-phosphorous-containing monomeric subunit m2.

Aspect 15. The system of Aspect 14, wherein the deoxidizing composition comprises a homopolymer.

Aspect 16. The system of Aspect 14, wherein the copolymer comprises a dipolymer.

Aspect 17. The system of Aspect 14, wherein the copolymer comprises a terpolymer.

Aspect 18. The system of any one of Aspects 14 to 17, wherein the monomeric subunit m1 is present in the homopolymer or copolymer in an amount of 5 molar percent 100 molar percent based on total homopolymer or copolymer molarity.

Aspect 19. The system of any one of Aspects 14 to 18, wherein the monomeric subunit m2 is present in the homopolymer or copolymer in an amount of no more than 95 molar percent based on total homopolymer or copolymer molarity.

Aspect 20. The system of any of Aspects 14 to 19, wherein the homopolymer or copolymer is present in the deoxidizing composition in an amount of 100 ppm to 3000 ppm based on total weight of the deoxidizing composition.

Aspect 21. The system of any of the preceding Aspects, wherein the diamine and/or the polyamine (A1) has at least one carbon positioned between the cyclic ring and at least one amino functional group.

Aspect 22. The system of any of the preceding Aspects, wherein the epoxy-containing compound (E1) comprises bisphenol A, bisphenol F, a novolac resin, or combinations thereof.

Aspect 23. The system of any of the preceding Aspects, wherein the diamine and/or the polyamine (A1) comprises xylylene diamine, phenylene diamine, diaminotoluene, diaminophenol, diaminodiphenyl methane, bis(aminomethyl)cyclohexane, or combinations thereof.

Aspect 24. The system of any of the preceding Aspects, wherein the diamine comprising the cyclic ring and/or the polyamine comprising the cyclic ring (A1) is present in an amount sufficient to provide a molar ratio of epoxide functional groups from the epoxy-containing compound (E1) to amine hydrogens from the diamine comprising the cyclic ring and/or the polyamine comprising the cyclic ring (A1) is 2:1 to 12:1.

Aspect 25. The system of any of the preceding Aspects, wherein the first reaction product comprises an epoxy-capped polyamine comprising a cyclic ring.

Aspect 26. The system of any of the preceding Aspects, wherein the epoxide-functional adduct (E2) further comprises elastomeric particles dispersed in a composition comprising the epoxy-containing compound (E1).

Aspect 27. The system of Aspect 26, wherein the elastomeric particles comprise a core-shell structure.

Aspect 28. The system of any of Aspects 1, 3, or 4 to 27, wherein the monoamine, diamine, and/or polyamine (A2) comprises an aliphatic amine, polyether amine, araliphatic amine, and/or a cycloaliphatic amine.

Aspect 29. The system of any of Aspects 1, 3, or 4 to 28, wherein the amine-functional adduct (A3) comprises a polyamine (A2) comprising ethylenediamine, bis(3-aminopropyl)diethylene glycol ether, bis(aminoethyl)ethylene glycol, or combinations thereof.

Aspect 30. The system of any of Aspects 1, 3, or 4 to 29, wherein the amine-functional adduct (A3) comprises a molar ratio of epoxide functional groups from the epoxide-functional adduct (E2) to amine-hydrogens from the monoamine, diamine, or polyamine (A2) is at least 1:2.

Aspect 31. The system of any of Aspects 1, 3, or 4 to 30, wherein the amine-functional adduct further comprises elastomeric particles dispersed in the epoxy-functional adduct (E2).

Aspect 32. The system of Aspect 31, wherein the elastomeric particles comprise a core-shell structure.

Aspect 33. The system of any of Aspects 1, 3, or 4 to 32, wherein the amine-functional adduct (A3) is present in the composition in an amount sufficient to provide a ratio of epoxide functional groups from the epoxy-containing compound (E1) to amine-hydrogens from the amine-functional adduct (A3) of 0.5:1.0 to 1.5:1.0.

Aspect 34. The system of any of Aspects 2 or 4 to 32, wherein the monoamine, diamine, and/or polyamine (A2) is present in the composition in an amount sufficient to provide a ratio of epoxide functional groups from the epoxide-functional adduct (E2) to amine-hydrogens from the monoamine, diamine, and/or polyamine (A2) of 0.5:1.0 to 1.5:1.0.

Aspect 35. The system of any of Aspects 1 to 34, wherein the coating composition further comprises elastomeric particles.

Aspect 36. The system of Aspect 35, wherein the elastomeric particles comprise a core-shell structure.

Aspect 37. The system of Aspect 35 or Aspect 36, wherein the elastomeric particles are present in the first component and are phase-separated from the epoxy-containing compound (E1) or the epoxy-functional adduct (E2).

Aspect 38. The system of Aspect 37, wherein the elastomeric particles are present in the coating composition in an amount of 5 percent by weight to 45 percent by weight based on total weight of the coating composition.

Aspect 39. The system of any of the preceding Aspects, wherein the coating composition further comprises an accelerator.

Aspect 40. The system of Aspect 39, wherein the accelerator comprises a guanidine and/or a tris(aminomethylphenol).

Aspect 41. The system of Aspect 39 or Aspect 40, wherein the accelerator is present in the coating composition in an amount of no more than 12 percent by weight based on total weight of the coating composition.

Aspect 42. The system of any of the preceding Aspects, wherein the coating composition further comprises fillers in an amount of no more than 25 percent by weight based on total weight of the composition.

Aspect 43. The system of any of the preceding Aspects, wherein the coating composition further comprises fillers in an amount of no more than 10 percent by weight based on total weight of the composition.

Aspect 44. The system of any of the preceding Aspects, wherein the coating composition further comprises additives in an amount of no more than 25 percent by weight based on total weight of the coating composition.

Aspect 45. The system of any of the preceding Aspects, wherein the coating composition is substantially free of platy fillers.

Aspect 46. The system of any of the preceding Aspects, wherein the coating composition comprises an adhesive composition or a sealant composition.

Aspect 47. The system of any of the preceding Aspects, further comprising a cleaner composition.

Aspect 48. The system of Aspect 47, wherein the cleaner composition has a pH of 7.0 or less.

Aspect 49. The system of Aspect 47, wherein the cleaner composition has a pH of greater than 7.0.

Aspect 50. A substrate treated with the system of any of Aspects 1 to 49.

Aspect 51. The substrate of Aspect 50, wherein the substrate comprises a surface, at least a portion of which is coated with or embedded in the composition of any of the Aspects 1 to 49.

Aspect 52. The substrate of Aspect 50 or Aspect 51, wherein the substrate comprises a fibrous material, a sheet, or a mesh.

Aspect 53. The substrate of Aspect 52, wherein the fibrous material, the sheet, or the mesh comprises a woven material, sheet, or mesh.

Aspect 54. The substrate of Aspect 52, wherein the fibrous material, the sheet, or the mesh comprises a non-woven sheet or mesh.

Aspect 55. The substrate of any of Aspects 50 to 54, wherein the fibrous material, the sheet, or the mesh comprises carbon fibers, glass fibers, and/or nylon.

Aspect 56. The substrate of any of Aspects 50 to 55, positioned between a second substrate and a third substrate.

Aspect 57. Protective clothing comprising the substrate of any of Aspects 50 to 56.

Aspect 58. A part treated with the system of any of Aspects 1 to 49.

Aspect 59. The part of Aspect 58 comprising a surface, at least a portion of which is coated with the composition of any of Aspects 1 to 49.

Aspect 60. An article treated with the system of any of Aspects 1 to 49.

Aspect 61. The article of Aspect 60 comprising a substrate comprising a surface, at least a portion of which is coated with the coating composition of any of Aspects 1 to 49.

Aspect 62. The article of Aspect 60 or Aspect 61, further comprising a second substrate, wherein the coating composition is positioned between the substrate and the second substrate.

Aspect 63. The article of Aspect 62, wherein one of the substrates comprises a ceramic and the other of the substrates comprises aluminum or a composite.

Aspect 64. The substrate of any of Aspects 50 to 56, the protective clothing of Aspect 57, the part of Aspect 58 or Aspect 59, and/or the article of any of Aspects 60 to 63, wherein the composition, in an at least partially cured state, has a lap shear displacement of at least 2.5 mm at failure and a lap shear strength of at least 30.0 MPa, wherein the lap shear displacement and the lap shear strength are measured according to ASTM D1002-10 using 2024-T3 aluminum substrate of 1.6 mm thickness, as measured by an INSTRON 5567 machine in tensile mode with a pull rate of 1.3 mm per minute.

Aspect 65. A method for treating a substrate, comprising: contacting at least a portion of a surface of the substrate with the deoxidizing composition of any one of Aspects 1 to 49; and contacting at least a portion of the surface with the coating composition of any of Aspects 1 to 49.

Aspect 66. The method of Aspect 65, further comprising treating the substrate with a composition comprising wax.

Aspect 67. The method of Aspect 65 or Aspect 66, further comprising contacting at least a portion of the substrate with a cleaning composition.

Aspect 68. The method of any one of Aspects 65 to 67, wherein the substrate is not contacted with a pretreatment composition following the contacting with the deoxidizing composition and prior to the contacting with the coating composition.

Aspect 69. The method of any of Aspects 65 to 68, further comprising at least partially curing the composition by exposing the composition to a temperature of at least 50° C.

Aspect 70. The method of Aspect 69, further comprising a second curing step comprising exposing the composition to a temperature of at least 120° C.

Aspect 71. A substrate treated with the method according to any of Aspects 65 to 70.

Aspect 72. A method of treating an extruded article with the system of any of Aspects 1 to 49 comprising:

extruding the coating composition of any of Aspects 1 to 49; and applying the deoxidizing composition of any of Aspects 1 to 49 to at least a portion of a surface of the article.

Aspect 73. The method of Aspect 72, wherein the extruding comprises three-dimensional printing.

Aspect 74. The method of Aspect 72 or Aspect 73, further comprising, before extruding, mixing the first component and the second component.

Aspect 75. The method of any of Aspects 72 to 74, wherein the extruding comprises applying successive layers to build the article.

Aspect 76. The article formed by the method of any of Aspects 72 to 75.

Aspect 77. Use of the deoxidizing composition according to any one of Aspects 1 to 49 for deoxidizing a substrate prior to depositing a coating composition onto said substrate.

Aspect 78. The use according to Aspect 77, wherein the coating composition is a coating composition as described in any one of Aspects 1 to 49 and/or the substrate is coated by a method for treating a substrate as described in any one of Aspects 65 to 70.

Aspect 79. The use according to Aspect 77, wherein the coating composition is a coating composition as described in any one of Aspects 1 to 49.

Aspect 80. Use of the coating composition according to any one of Aspects 1 to 49 to form an article by a method as described in any one of Aspects 72 to 75.

Aspect 81. The use according to Aspect 80, wherein the deoxidizing composition according to any one of Aspects 1 to 49 is used to deoxidize a surface of the article following forming the article.

Illustrating the invention are the following examples which, however, are not to be considered as limiting the invention to their details. Unless otherwise indicated, all parts and percentages in the following examples and throughout the specification are by weight.

EXAMPLES

Example 1

A deoxidizing composition (DEOX-1) was prepared in a clean 5-gallon plastic bucket to which 18.2 liters of deionized water, 180.5 g fluorosilicic acid (23% solution), 80 g fluorozirconic acid (45% solution), 11.61 g potassium bifluoride, and 31.6 g of Chemfil Buffer (commercially available from PPG Industries, Inc.) were added.

Lap shear specimens were prepared using Compositions I through XXI below according to ASTM D1002-10. The substrate used was 2024-T3 aluminum alloy panels (OnLine Metals) measuring 25.4 mm×101.6 mm×1.6 mm. The panels were cleaned with acetone and treated with DEOX-1. Composition was applied to one end of a panel covering the full 25.4 mm width and ≥12.7 mm from one end. A second pretreated aluminum panel was then placed over the composition layer in an end-to-end fashion, resulting in a bond area of 25.4 mm×12.7 mm. Lap joints were secured with metal clips and excess composition cleaned, leaving a 45° fillet. The baked lap joint specimens were tested using an INSTRON model 5567 in tensile mode with 25.4 mm of aluminum substrate in each grip and at a pull rate of 1.3 mm per minute (in accordance with ASTM D1002-10). The cured lap joint specimens were tested using an INSTRON model 5567 in tensile mode with 25.4 mm of aluminum substrate in each grip and at a pull rate of 1.3 mm per minute (in accordance with ASTM D1002-10).

TABLE 1

| Composition I | |
|---|---|
| Component | I (E2) |
| Epon 863[1] | 483.75 |
| m-xylylenediamine[2] | 16.25 |
| Total | 500 |
| E:AH ratio | 6:1 |
| Theoretical epoxy equivalent weight of reaction product | 209.63 |

[1]Bisphenol F epoxy resin available from Hexion
[2]Diamine containing a cyclic ring (A1), available from Sigma Aldrich Composition I of Table 1 was prepared by adding m-xylylenediamine to the Bisphenol F epoxy at a molar ratio of epoxide functional groups from the epoxy-containing compound to amine-hydrogens from the diamine or polyamine containing a cyclic ring (E:AH) of 6:1. The m-xylylenediamine was added to the epoxy resin drop-wise at 70° C. yielding a reaction product with a theoretical epoxy equivalent weight of 209.6 grams per epoxide.

TABLE 2

| Compositions II-X (A3 Compositions) | | | | | | | | | |
|---|---|---|---|---|---|---|---|---|---|
| Component | II | III | IV | V | VI | VII | VIII | IX | X |
| Composition I | 18.08 | 20.73 | 24.29 | 18.52 | 21.62 | 13.78 | 16.12 | 19.40 | 14.58 |
| Jeffamine EDR-148 [1] | 31.92 | 29.27 | 25.71 | 29.90 | 25.55 | | | | |
| Ancamine 1922A[2] | | | | | | 36.22 | 33.88 | 30.60 | 33.64 |
| Dyhard 100SF[3] | | | | 1.58 | 2.83 | | | | 1.78 |
| Total | 50.00 | 50.00 | 50.00 | 50.00 | 50.00 | 50.00 | 50.00 | 50.00 | 50.00 |
| E:AH (including amines from the dicyandiamide) | 1:10 | 1:8 | 1:6 | 1:10 | 1:8 | 1:10 | 1:8 | 1:6 | 1:10 |
| Theoretical amine-hydrogen equivalent weight of reaction product | 64.4 | 72.2 | 86.4 | 62.9 | 69.2 | 84.5 | 92.9 | 108.0 | 79.9 |

[1] Bis(aminoethyl)ethylene glycol, available from Huntsman
[2]Bis(3-aminopropyl)diethylene glycol ether, available from Evonik
[3]Dicyandiaminde available from AlzChem The epoxy-functional reaction product formed in Table 1 (Composition I, E2) was then added dropwise at 70° C. to the components (A2) listed in Table 2 above at various amine-hydrogen to epoxide ratios, yielding amine functional adducts (A3) with the theoretical amine-hydrogen equivalent weights listed in Table 2 above.

TABLE 3

| Compositions XI-XXI | | | | | | | | | | | |
|---|---|---|---|---|---|---|---|---|---|---|---|
| Component | XI | XII | XIII | XIV | XV | XVI | XVII | XVIII | XIX | XX | XXI |
| Epon 863 | 2.12 | 1.65 | 0.90 | 2.22 | 1.85 | 1.00 | 0.55 | 0 | 1.25 | 2.75 | 4.10 |
| Kane Ace MX-135[1] | 16.00 | 16.00 | 16.00 | 16.00 | 16.00 | 16.00 | 16.00 | 16.00 | 16.00 | 16.00 | 16.00 |
| Composition II | 5.63 | | | | | | | | | | |
| Composition III | | 6.10 | | | | | | | | | |
| Composition IV | | | 6.85 | | | | | | | | |
| Composition V | | | | 5.53 | | | | | | | |
| Composition VI | | | | | 5.90 | | | | | | |
| Composition VII | | | | | | 6.75 | | | | | |
| Composition VIII | | | | | | | 7.20 | | | | |
| Composition IX | | | | | | | | 8.00 | | | |
| Composition X | | | | | | | | | 6.50 | | |
| Jeffamine EDR-148 | | | | | | | | | | 5.00 | |
| Ancamine 1922A | | | | | | | | | | | 3.65 |
| Ancamine K-54[2] | 0.50 | 0.50 | 0.50 | 0.50 | 0.50 | 0.50 | 0.50 | 0.50 | 0.50 | 0.50 | 0.50 |
| Total | 25.00 | 25.00 | 25.00 | 25.00 | 25.00 | 25.00 | 25.00 | 25.25 | 25.00 | 25.00 | 25.00 |
| Lap Shear Strength (70° C. 1 hr cure) [MPa] | 38 | 37 | 39 | 41 | 42 | 34 | 34 | 34 | 36 | 24 | 29 |
| Disp. at Failure (70° C. 1 hr cure) [mm] | 2.2 | 2.2 | 2.4 | 2.5 | 2.7 | 2.0 | 2.0 | 1.9 | 2.2 | 1.3 | 1.6 |
| Lap Shear Strength (Ambient cure, 7 days) [MPa] | 32 | 34 | 34 | 33 | 35 | 31 | 30 | 30 | 32 | 11 | 20 |
| Disp. at Failure (Ambient cure, 7 days) [mm] | 2.0 | 2.1 | 2.1 | 2.1 | 2.3 | 2.1 | 1.8 | 1.8 | 1.9 | 0.6 | 1.1 |

[1]Blend of bisphenol F epoxy resin and ~100 nm diameter core-shell styrene-butadiene rubber available from Kaneka Corporation

[2]2,4,6-tris(N,N-dimethylaminomethyl)phenol available from Evonik[6]Ancamine K-54 available from Evonik Compositions II-X (A3) were then utilized in the two-component adhesive formulations in Table 3. The epoxy-functional resins were premixed using a DAC SpeedMixer®, then the amine-functional components, accelerators, and 10 mil spacer beads at 2% by weight were added and mixed for 2 minutes at 2350 RPM using a DAC SpeedMixer®. Lap shear specimens were prepared immediately using compositions XI-XXI above. Lap shear strength and displacement are presented in Table 3 following a one hour cure at 70° C. or a 7 day cure under ambient conditions. Lap shear results demonstrate the improved strength and displacement in compositions comprising an epoxy-containing component (E1) and an amine functional adduct (A3).

Example 2

Compositions XXII and XXIII were prepared from the mixtures of ingredients shown in Table 4. The compositions were prepared at an E:AH molar ratio of 6:1 and 8:1 with the amine side added to the epoxy drop-wise at 70° C.

TABLE 4

| Compositions XXII-XXIII | | |
|---|---|---|
| Components | XXII | XXIII |
| Kane Ace MX-135 | 25 | 25 |
| Epon 863 | 25 | 25 |
| m-xylylenediamine | 1.46 | 1.11 |
| Total | 51.46 | 51.11 |

Compositions XXII and XXIII were then utilized in the two-component adhesive formulations in Table 5. For Compositions XXIV-XXV, the epoxy-functional resins were premixed using a SpeedMixer®, then the amine-functional components, accelerators, and 4.1 mil spacer beads at 2% by weight were added and mixed for 2 minutes at 2350 RPM using a SpeedMixer®. In composition XXIV and XXV the Dyhard 100SF was first dissolved in the liquid diamine before blending with the epoxy component. Lap shear specimens were prepared immediately using Compositions XXIV-XXV, as described in Example 1. Lap joints were tested for lap shear strength and displacement as described in Example 1. Lap shear strength and displacement are presented in Table 5 following a one hour cure at 70° C. or a 7 day cure under ambient conditions.

TABLE 5

| Compositions XXIV-XXV | | |
|---|---|---|
| Components | XXIV | XXV |
| Composition XXII (E:AH molar ratio, 6:1) | 19.85 | |
| Composition XXIII (E:AH molar ratio, 8:1) | | 20.82 |
| Ancamine 1922A | 3.46 | 3.62 |
| Dyhard 100SF | 0.69 | 0.73 |
| Ancamine K-54 | 0.50 | 0.50 |
| Total | 24.5 | 24.5 |
| Lap Joint Performance | | |
| Lap Shear Strength (70° C. cure) [MPa] | 45.6 ± 0.8 | 40.0 ± 3.8 |
| Displacement at Failure (70° C. cure) [mm] | 3.52 ± 0.08 | 2.63 ± 0.40 |
| Lap Shear Strength (Ambient Cure) [MPa] | 26.1 ± 3.3 | 28.1 ± 1.8 |

TABLE 5-continued

| Compositions XXIV-XXV | | |
|---|---|---|
| Components | XXIV | XXV |
| Displacement at Failure (Ambient Cure) [mm] | 1.68 ± 0.18 | 1.75 ± 0.09 |

The results indicate that by reacting the epoxy component (E1) with m-xylylenediamine (A1) to yield E2 and completing the cure with the aliphatic Ancamine 1922A (A2) gives outstanding lap shear strength and displacement.

Example 3

TABLE 6

| Compositions XXVI-XXVII | | |
|---|---|---|
| Components | XXVI | XXVII (Comp) |
| Epon 863 | 120.9 | 46.8 |
| m-xylylenediamine | 4.1 | |
| Jeffamine EDR-148 | 133 | 53.4 |
| Theoretical Amine Hydrogen Equivalent Weight of Reaction Product | 86.0 | 87.4 |

Synthesis of Composition XXVI: To a round bottom flask equipped with a nitrogen inlet and addition funnel was added Epon 863 (120.9 g, 2.86 eq.) and blanketed with nitrogen. Via the addition funnel, m-xylylenediamine (MXDA, 4.1 g, 0.48 eq.) was added dropwise over 30 minutes, resulting in exotherm of the reaction mixture to ca. 80° C. The resulting mixture was held at 70° C. for ca. 8 h, at which time TLC showed complete consumption of the MXDA. In a separate flask, Jeffamine EDR-148 (133.0 g, 14.4 eq.) was blanketed with nitrogen, and the MXDA-Epon 863 reaction product was slowly dispersed into the Jeffamine EDR-148, resulting in exotherm of the reaction mixture to ca. 125° C. The resulting mixture was allowed to cool for 72 h, then was heated to 70° C. ca. 8 h, at which time TLC indicated complete consumption of the MXDA-Epon 863 reaction product. The reaction product was poured into a suitable container for storage.

Synthesis of Composition XXVII: To a round bottom flask equipped with a nitrogen inlet and addition funnel was added Jeffamine EDR-148 (53.4 g, 1.44 eq.). Via the addition funnel, Epon 863 (46.8 g, 0.28 eq.) was added dropwise over 1 hour. The resulting mixture was held at 70° C. for a total of ca. 8 h, at which time TLC indicated consumption of the Epon 863. The reaction product was poured into a suitable container for storage.

Compositions XXVI and XXVII were then utilized in the two-component adhesive formulations in Table 7. For Compositions XXVIII-XXIX, the epoxy-functional resins and filler were premixed using a SpeedMixer®, then the amine-functional components, accelerators, and 10 mil spacer beads at 2% by weight were added and mixed for 2 minutes at 2350 RPM using a SpeedMixer®. Lap shear specimens were prepared immediately, as described in Example 1. Lap joints were tested for lap shear strength and displacement as described in Example 1. Lap shear strength and displacement are presented in Table 7 following a one hour cure at 70° C.

TABLE 7

| Compositions XXVIII-XXIX | | |
|---|---|---|
| Components | XXVIII | XXIX (Comp) |
| Kane-Ace MX-135 | 16.00 | 16.00 |
| Epon 863 | 0.83 | 0.75 |
| Aerosil R202[1] | 0.50 | 0.50 |
| Composition XXVI | 6.67 | |
| Composition XXVII | | 6.75 |
| Ancamine K-54 | 0.50 | 0.50 |
| Lap Joint Performance | | |
| Lap Shear Strength (70° C. cure) [MPa] | 41.9 ± 1.1 | 40.4 ± 1.3 |
| Displacement at Failure (70° C. cure) [mm] | 2.6 ± 0.2 | 2.3 ± 0.1 |

[1]Hydrophobic fumed silica available from Evonik

The results indicate that by reacting the epoxy component (E1) with m-xylylenediamine (A1) to yield E2 and completing the cure with the aliphatic Ancamine 1922A (A2) gives improved lap shear strength and displacement over samples prepared without a cyclic containing amine A1.

Example 4

Lap joint specimens (prepared according to ASTM D1002-10 as described above) were prepared using Loctite EA 9309, Loctite EA 9320, or Loctite EA 9395 (each commercially available from Henkel), DP460NS (commercially available from 3M), and with Composition II (prepared as described above) under identical conditions. In order to maintain a bondline thickness, 4.1 mil glass beads were added to each composition at 2% by weight based on total weight of the composition. Lap joint specimens were baked at 70° C. for 60 minutes. Testing was conducted according to ASTM D1002-10.

TABLE 5

| Lap Joint Performance | | | | | |
|---|---|---|---|---|---|
| Composition | Loctite EA9309 (comparative) | Loctite EA9320 (comparative) | Loctite EA9395 (comparative) | DP460NS (comparative) | XXIV |
| Lap Shear Strength [MPa] | 33.0 ± 0.8 | 36.1 ± 3.2 | 27.4 ± 2.2 | 36.4 ± 0.7 | 45.6 ± 0.8 |
| Displacement at Failure [mm] | 2.10 ± 0.05 | 2.31 ± 0.19 | 1.73 ± 0.13 | 1.80 ± 0.05 | 3.52 ± 0.08 |

The results indicate the outstanding combination of lap shear strength and displacement of compositions based on an epoxy-functional adduct E2 and an amine curing agent A2 compared to commercial adhesive compositions.

It will be appreciated by skilled artisans that numerous modifications and variations are possible in light of the above disclosure without departing from the broad inventive concepts described and exemplified herein. Accordingly, it is therefore to be understood that the foregoing disclosure is merely illustrative of various exemplary aspects of this application and that numerous modifications and variations can be readily made by skilled artisans which are within the spirit and scope of this application and the accompanying claims.

We claim:

1. A system for treating a substrate, comprising:

a deoxidizing composition comprising a Group IVA metal and/or a Group IVB metal and free fluoride, wherein the deoxidizing composition has a pH of 1.0 to 3.0; and a coating composition comprising:

a first component comprising a first epoxy-containing compound; and a second component that chemically reacts with the first epoxy-containing compound, the second component comprising an amine-functional adduct (A3) comprising a second reaction product of reactants comprising (a) a monoamine, diamine, and/or polyamine (A2) and (b) an epoxide-functional adduct (E2), wherein the epoxide-functional adduct (E2) comprises a first reaction product of reactants comprising (i) a second epoxy-containing compound (E1) and (ii) a diamine comprising a cyclic ring and/or a polyamine comprising a cyclic ring (A1).

2. The system of claim 1, wherein the deoxidizing composition further comprises (a) a Group IA metal, (b) a Group VIB metal, (c) an electropositive metal, and/or (d) a homopolymer or copolymer comprising a phosphorous-containing monomeric subunit m1 and/or a non-phosphorous-containing monomeric subunit m2.

3. A substrate treated with the system of claim 1.

4. The substrate of claim 3 comprising a coating formed from the coating composition, wherein the coating has a lap shear displacement of at least 2.5 mm at failure and a lap shear strength of at least 30.0 MPa, wherein the lap shear displacement and the lap shear strength each are measured according to ASTM D1002-10 using 2024-T3 aluminum substrate of 1.6 mm thickness, as measured by an INSTRON 5567 machine in tensile mode with a pull rate of 1.3 mm per minute.

5. A method for treating a substrate, comprising: contacting at least a portion of a surface of the substrate with the deoxidizing composition of claim 1; and contacting at least a portion of the surface with the coating composition of claim 1.

6. The method of claim 5, wherein the substrate is not contacted with a pretreatment composition following the contacting with the deoxidizing composition and prior to the contacting with the coating composition.

7. A method of treating an extruded article with the system of claim 1 comprising:

extruding the coating composition of claim 1; and applying the deoxidizing composition of claim 1 to at least a portion of a surface of the article.

* * * * *